(12) United States Patent
Sudoh

(10) Patent No.: US 9,500,876 B2
(45) Date of Patent: Nov. 22, 2016

(54) ZOOM LENS UNIT AND IMAGING APPARATUS

(71) Applicant: Yoshifumi Sudoh, Saitama (JP)

(72) Inventor: Yoshifumi Sudoh, Saitama (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/584,167

(22) Filed: Dec. 29, 2014

(65) Prior Publication Data

US 2015/0237265 A1  Aug. 20, 2015

(30) Foreign Application Priority Data

Feb. 19, 2014 (JP) .................................. 2014-029568

(51) Int. Cl.
G02B 15/14 (2006.01)
G02B 27/42 (2006.01)
(Continued)

(52) U.S. Cl.
CPC ......... G02B 27/4211 (2013.01); G02B 15/173 (2013.01); *G02B 5/005* (2013.01);
(Continued)

(58) Field of Classification Search
CPC ........ G02B 9/34; G02B 13/18; G02B 15/14; G02B 13/009; G02B 13/0015; G02B 16/167; G02B 5/005; G02B 13/006; G02B 13/002; G02B 13/0055; G02B 15/24; G02B 27/0037; G02B 27/0056; G02B 27/0062; G02B 27/0944; G02B 27/42; G02B 27/4205; G02B 5/1814; G02B 9/36; G02B 27/0025; G02B 15/20; G02B 13/0045; G02B 7/008
USPC ....... 359/558, 574, 683, 688, 707, 715, 740, 359/775
See application file for complete search history.

(56) References Cited

U.S. PATENT DOCUMENTS 7,885,014 B2 * 2/2011 Inomoto ............. G02B 15/173
359/688
2007/0201144 A1 8/2007 Sudoh
(Continued)

FOREIGN PATENT DOCUMENTS

JP 60-126618 7/1985
JP 61-204610 9/1986
(Continued)

OTHER PUBLICATIONS

U.S. Appl. No. 14/207,720, filed Mar. 13, 2014.
(Continued)

*Primary Examiner* — Evelyn A Lester
(74) *Attorney, Agent, or Firm* — Oblon, McClelland, Maier & Neustadt, L.L.P

(57) ABSTRACT

A zoom lens unit comprises a first and fourth lens groups with positive refractive power, a second and third lens groups with negative refractive power. The first and the fourth lens groups are fixed, the second lens group moves toward an image side and the fourth lens group moves when changing a magnification ratio from a wide-angle end to a telephoto end. The fourth lens group includes a negative resin lens and at least one positive lens. At least one of said positive lenses fulfills following conditions:

$1.40 < n_d < 1.65$ $65.0 < v_d < 100.0$ $0.015 < P_{g,F} - (-0.001802 \times v_d + 0.6483) < 0.060$ where $n_d$, $v_d$, and $P_{g,F}$ each represents a refractive index, an Abbe number, a partial dispersion ratio of the positive lens. $P_{g,F}$ is $(n_g - n_F)/(n_F - n_C)$, where $n_g$, $n_F$, and $n_C$ represent refractive indexes at g-line, F-line, and C-line of the positive lens.

9 Claims, 14 Drawing Sheets

(51) Int. Cl.
*G02B 15/173* (2006.01)
*G02B 13/00* (2006.01)
*G02B 13/18* (2006.01)
*G02B 27/00* (2006.01)
*G02B 9/36* (2006.01)
*G02B 5/00* (2006.01)
*G02B 9/34* (2006.01)
*G02B 15/20* (2006.01)
*G02B 27/09* (2006.01)
*G02B 5/18* (2006.01)
*G02B 15/24* (2006.01)
*G02B 7/00* (2006.01)

(52) U.S. Cl.
CPC ............ *G02B 5/1814* (2013.01); *G02B 7/008* (2013.01); *G02B 9/34* (2013.01); *G02B 9/36* (2013.01); *G02B 13/002* (2013.01); *G02B 13/006* (2013.01); *G02B 13/009* (2013.01); *G02B 13/0015* (2013.01); *G02B 13/0045* (2013.01); *G02B 13/0055* (2013.01); *G02B 13/18* (2013.01); *G02B 15/14* (2013.01); *G02B 15/20* (2013.01); *G02B 15/24* (2013.01); *G02B 27/0025* (2013.01); *G02B 27/0037* (2013.01); *G02B 27/0056* (2013.01); *G02B 27/0062* (2013.01); *G02B 27/0944* (2013.01); *G02B 27/42* (2013.01); *G02B 27/4205* (2013.01)

(56) References Cited

U.S. PATENT DOCUMENTS

| | | |
|---|---|---|
| 2007/0247726 A1 | 10/2007 | Sudoh |
| 2008/0278779 A1 | 11/2008 | Nishina et al. |
| 2009/0067060 A1 | 3/2009 | Sudoh |
| 2009/0122418 A1 | 5/2009 | Atsuumi et al. |
| 2009/0135500 A1 | 5/2009 | Sudoh et al. |
| 2009/0147375 A1 | 6/2009 | Sudoh et al. |
| 2009/0323200 A1 | 12/2009 | Sudoh |
| 2010/0027136 A1 | 2/2010 | Ohashi et al. |
| 2010/0182705 A1 | 7/2010 | Hori et al. |
| 2010/0296180 A1 | 11/2010 | Sudoh et al. |
| 2011/0043927 A1 | 2/2011 | Sudoh |
| 2011/0051260 A1 | 3/2011 | Nakayama et al. |
| 2011/0069402 A1 | 3/2011 | Sudoh |
| 2011/0222169 A1 | 9/2011 | Sudoh |
| 2011/0228408 A1 | 9/2011 | Sudoh |
| 2012/0127586 A1 | 5/2012 | Sudoh |
| 2013/0003189 A1* | 1/2013 | Sanjo ..................... G02B 7/008 359/686 |
| 2015/0070780 A1 | 3/2015 | Sudoh |
| 2015/0130961 A1 | 5/2015 | Sudoh |
| 2015/0260969 A1 | 9/2015 | Sudoh |

FOREIGN PATENT DOCUMENTS

| | | |
|---|---|---|
| JP | 63-179310 | 7/1988 |
| JP | 04-088310 | 3/1992 |
| JP | 2010-186179 | 8/2010 |
| JP | 2013-033242 | 2/2013 |

OTHER PUBLICATIONS

U.S. Appl. No. 14/445,408, filed Jul. 29, 2014.

* cited by examiner

FIG.1
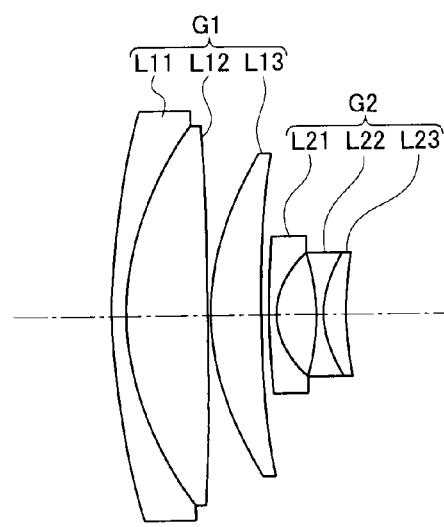
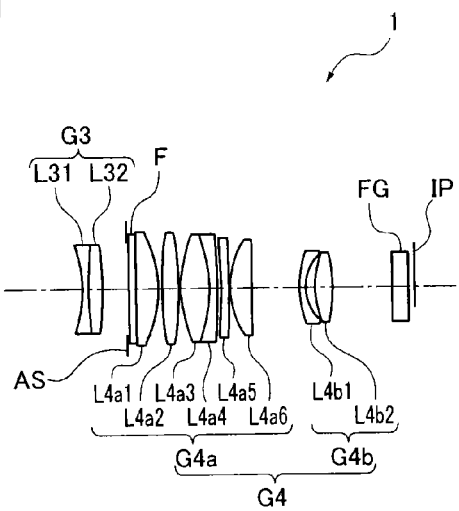
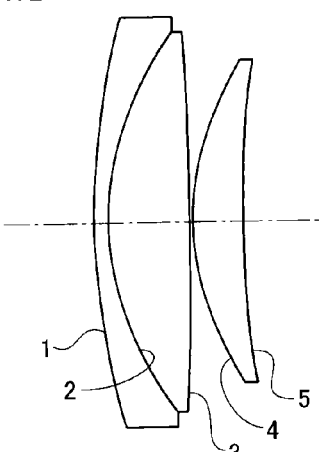
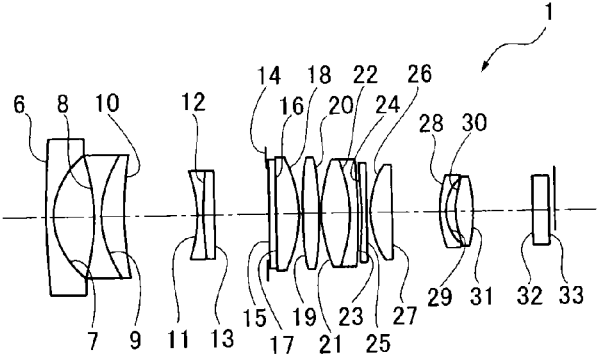
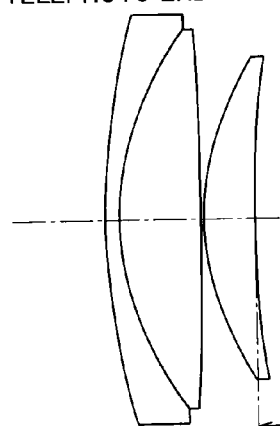
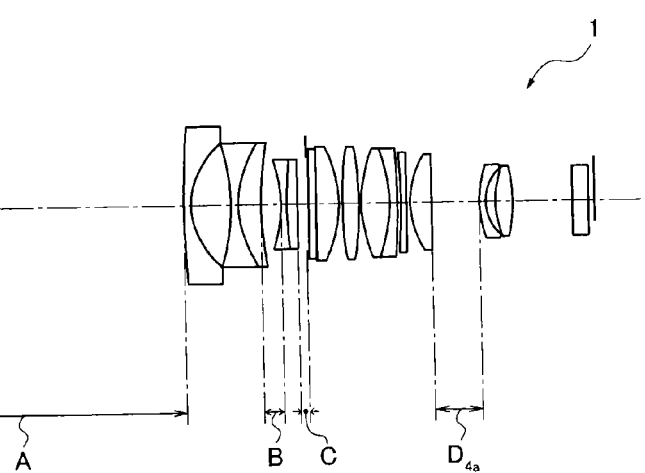

FIG.2
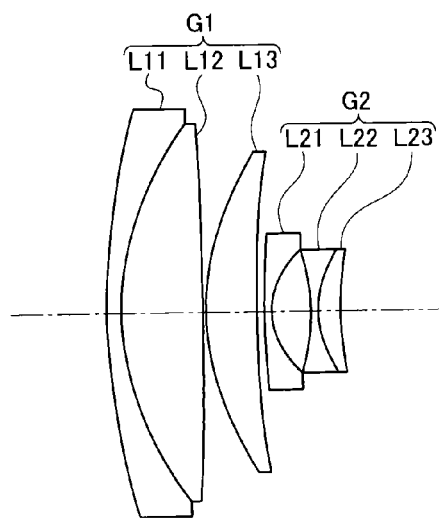
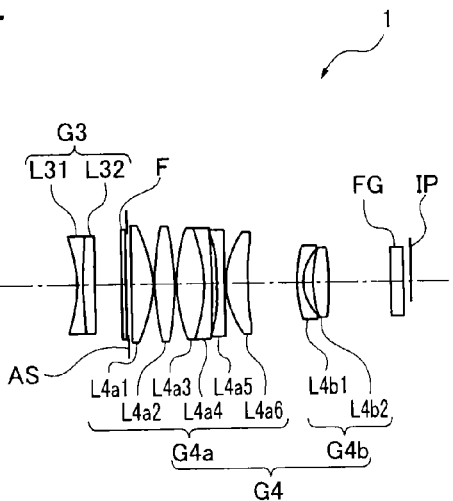
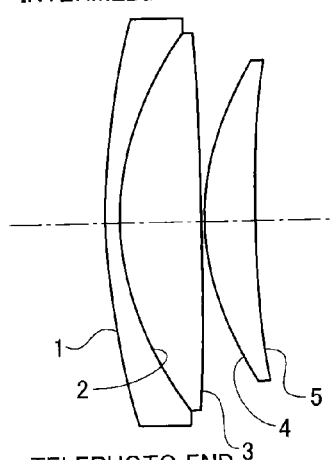
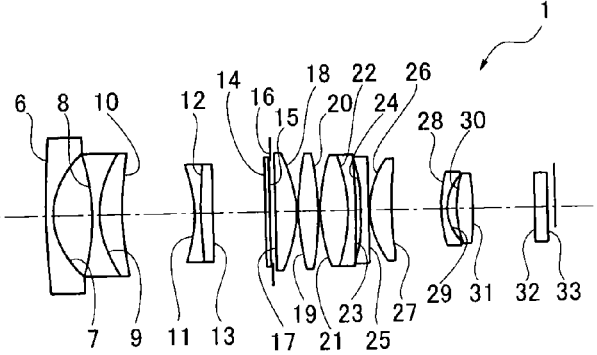
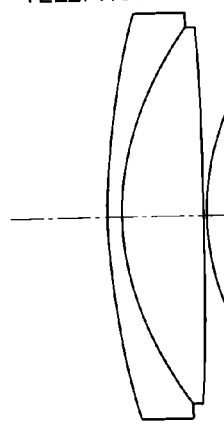
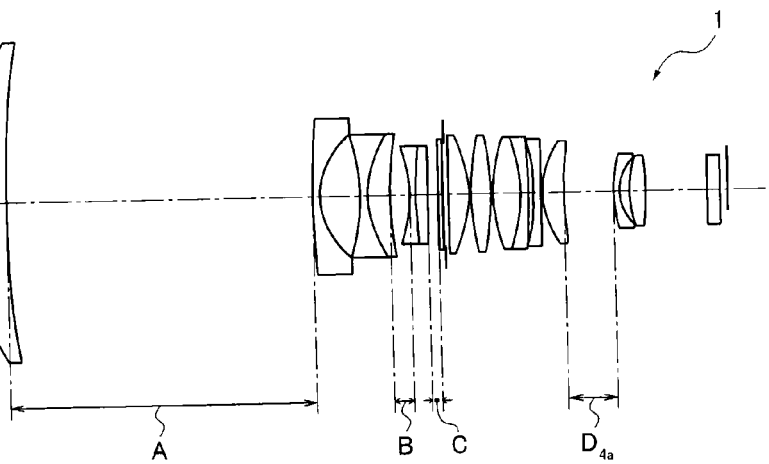

FIG.3
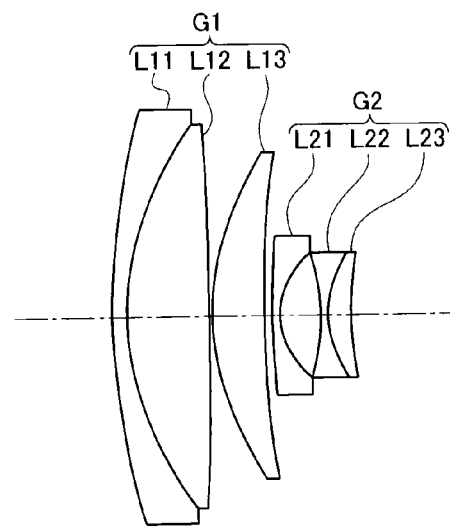
WIDE-ANGLE END
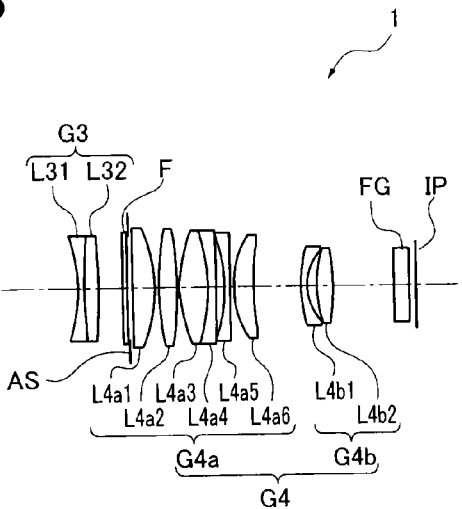
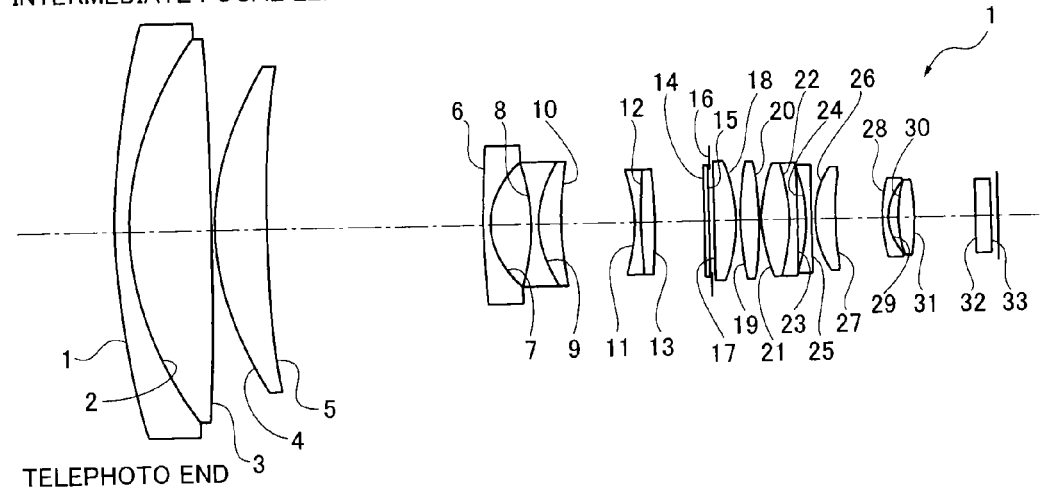
INTERMEDIATE FOCAL LENGTH
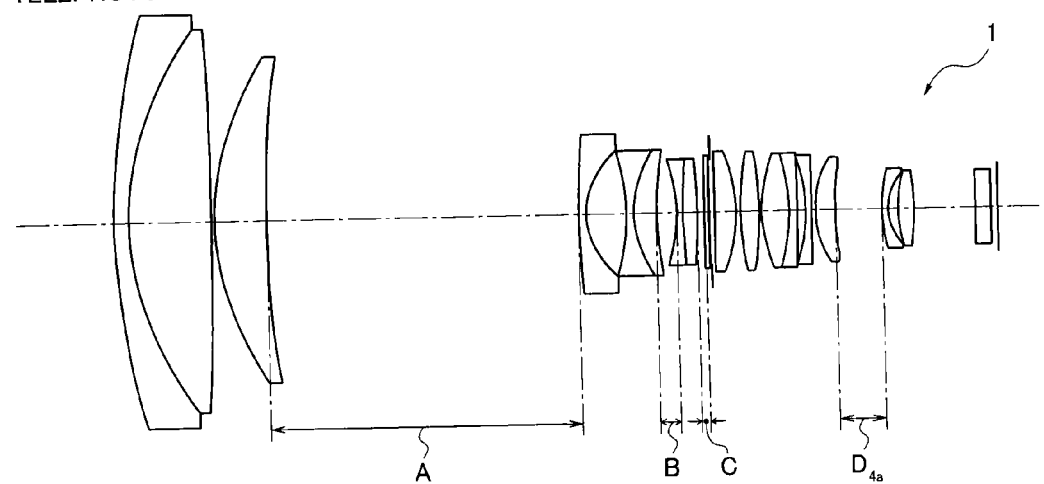
TELEPHOTO END FIG.4
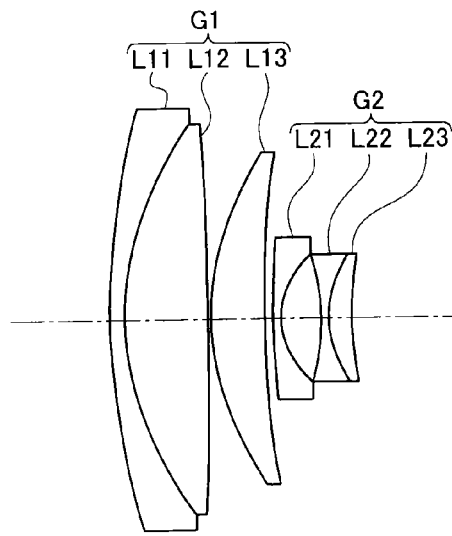
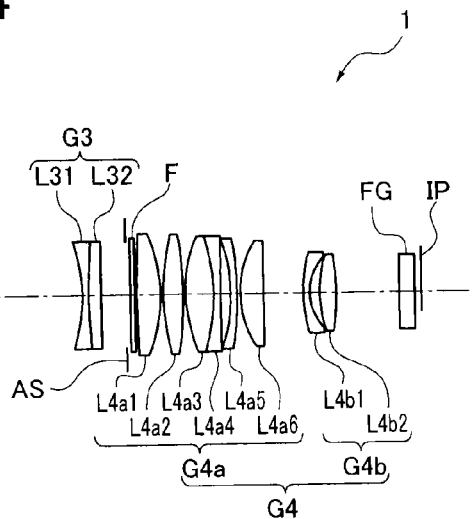
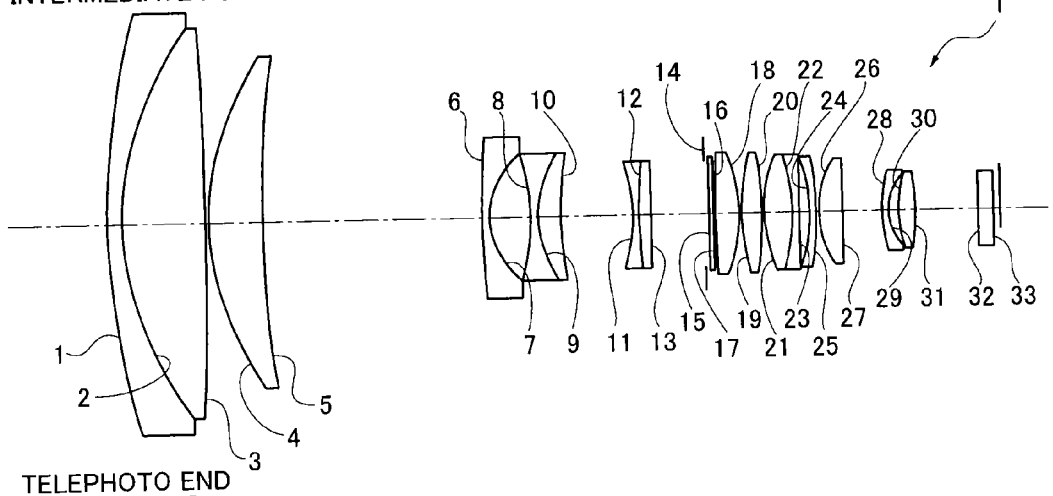
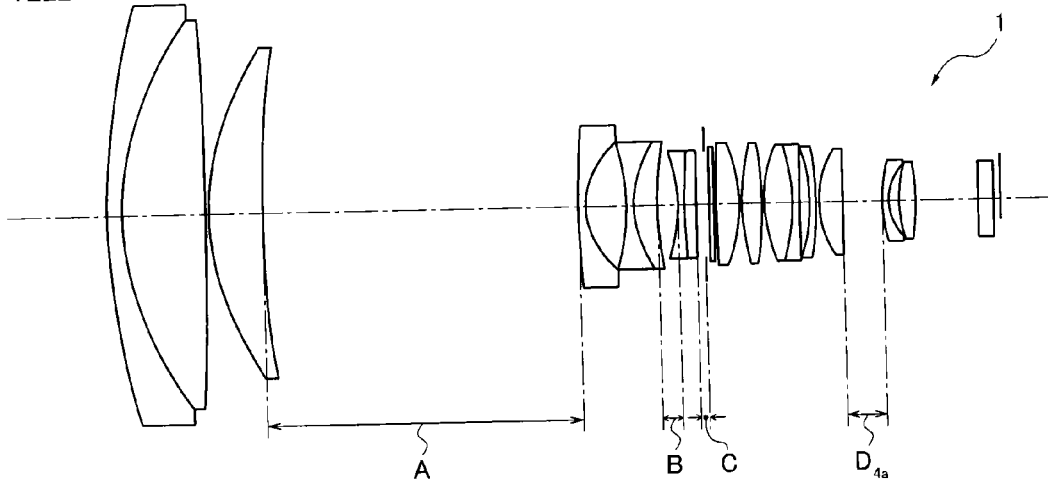

FIG.5
WIDE-ANGLE END
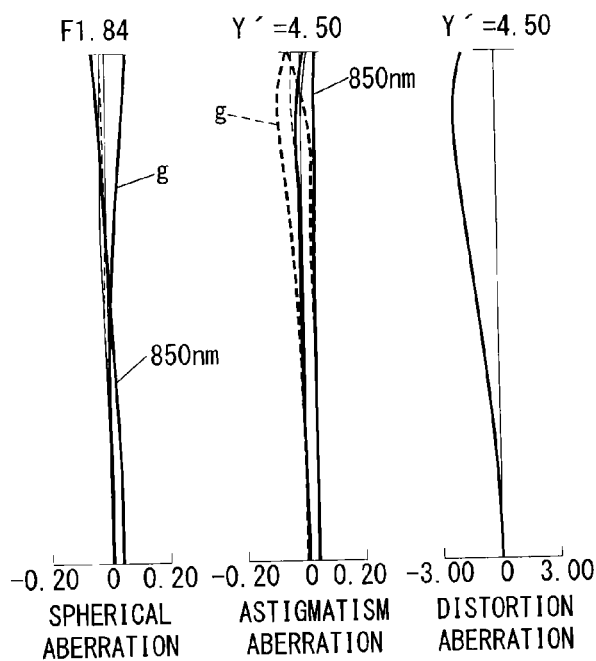
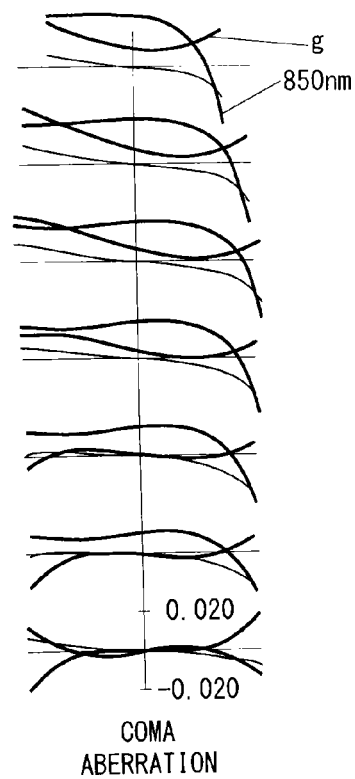
FIG.6
INTERMEDIATE FOCAL LENGTH
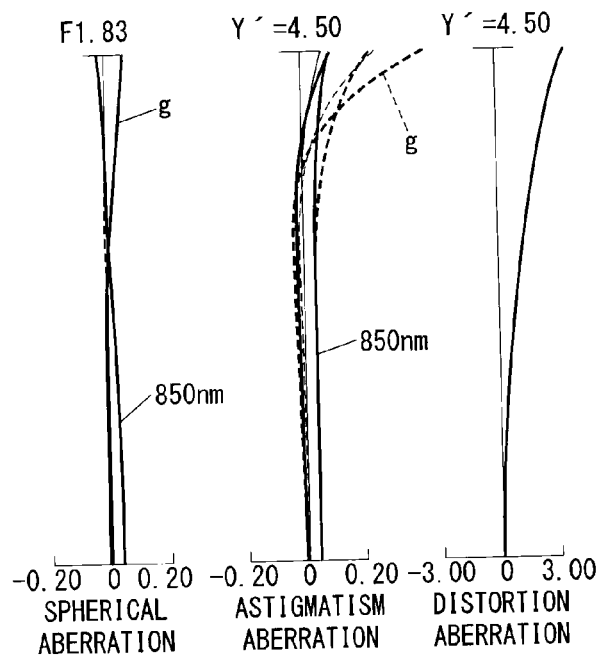
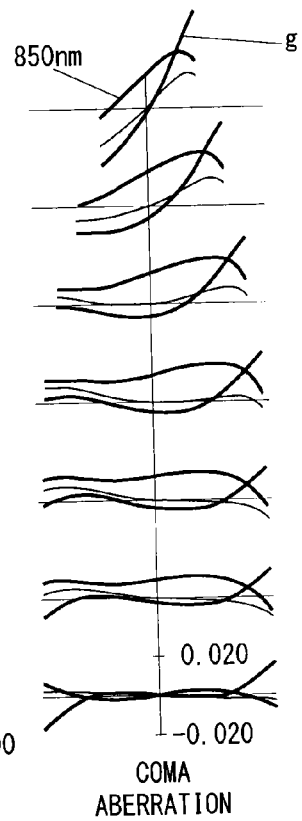

FIG.8
WIDE-ANGLE END
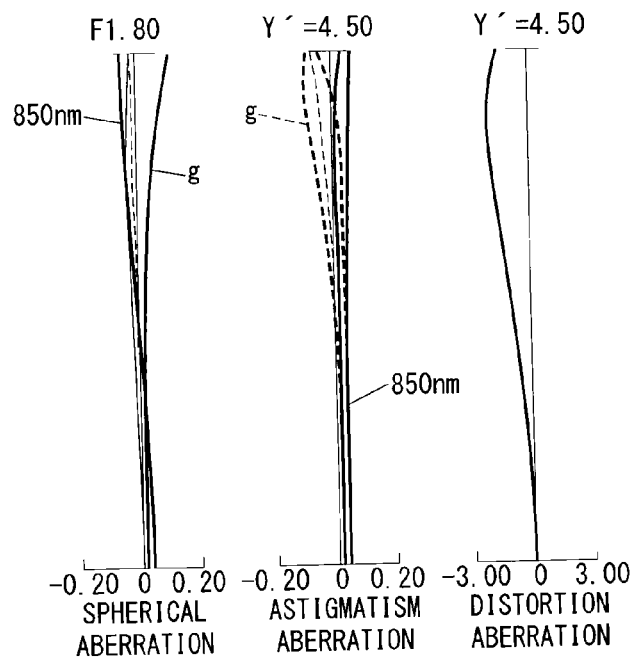
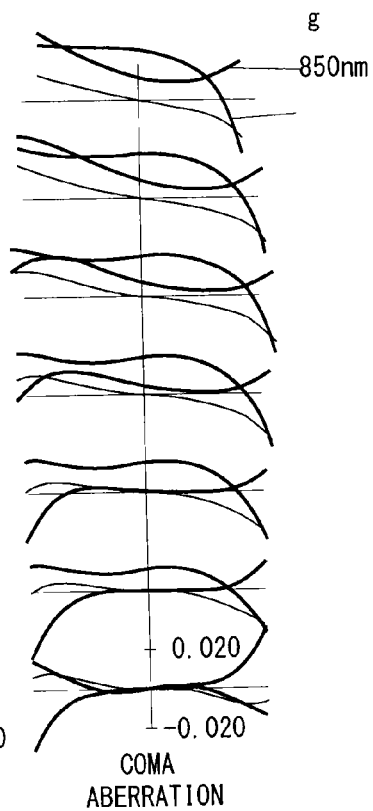
FIG.9
INTERMEDIATE FOCAL LENGTH
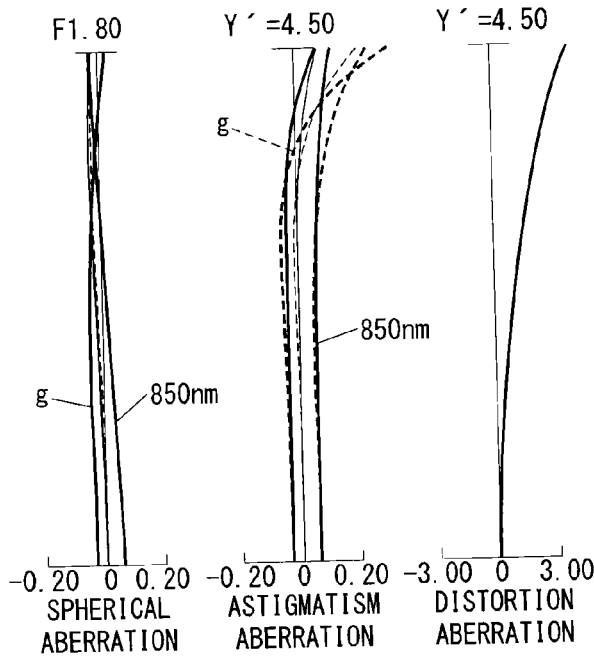
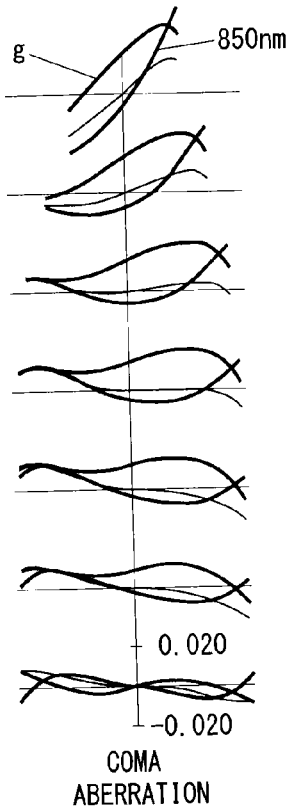

TELEPHOTO END

FIG.11
WIDE-ANGLE END
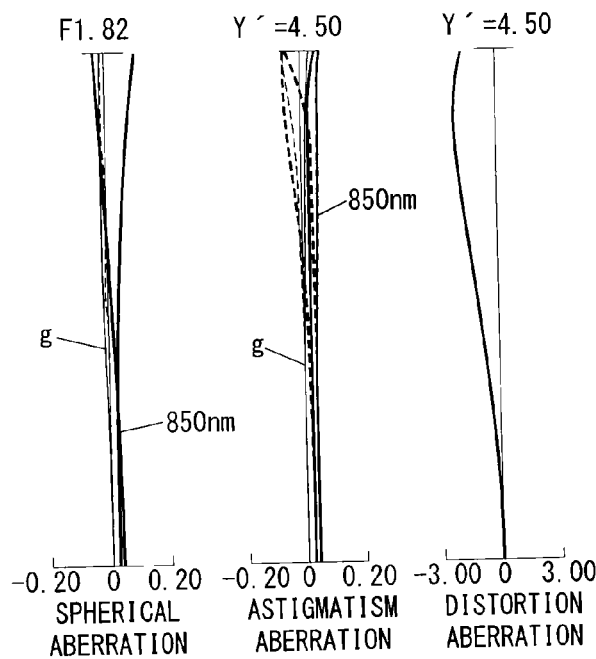
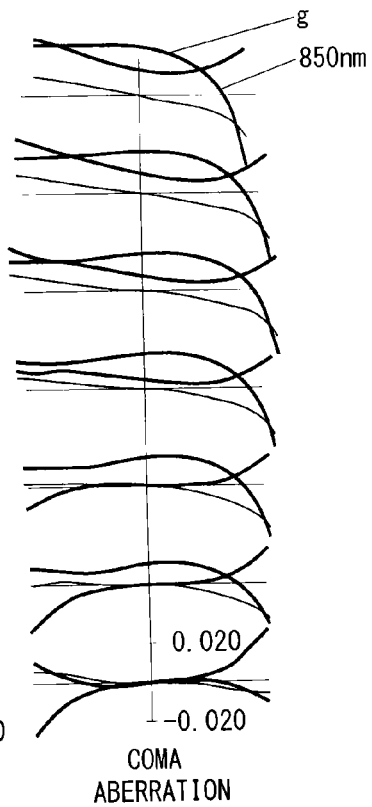
FIG.12
INTERMEDIATE FOCAL LENGTH
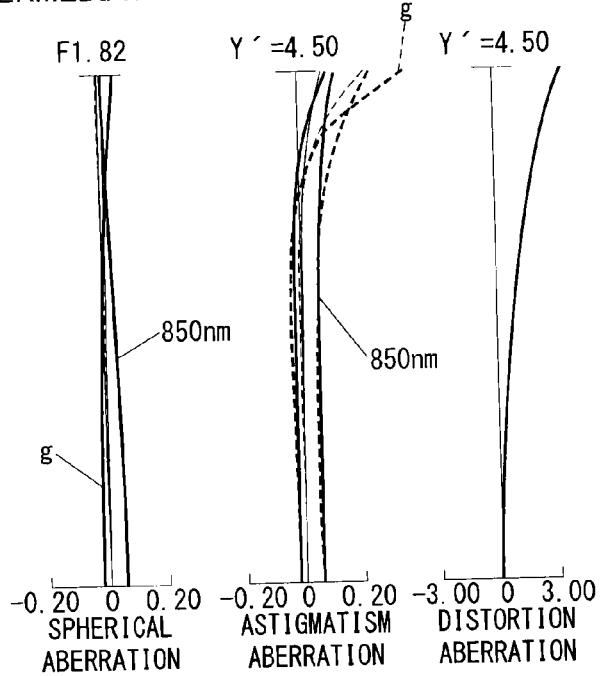
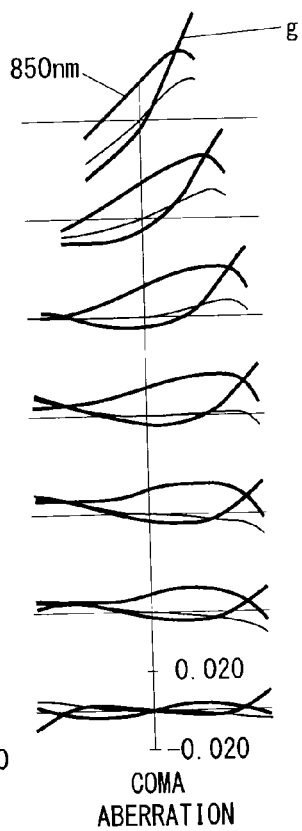

FIG.13
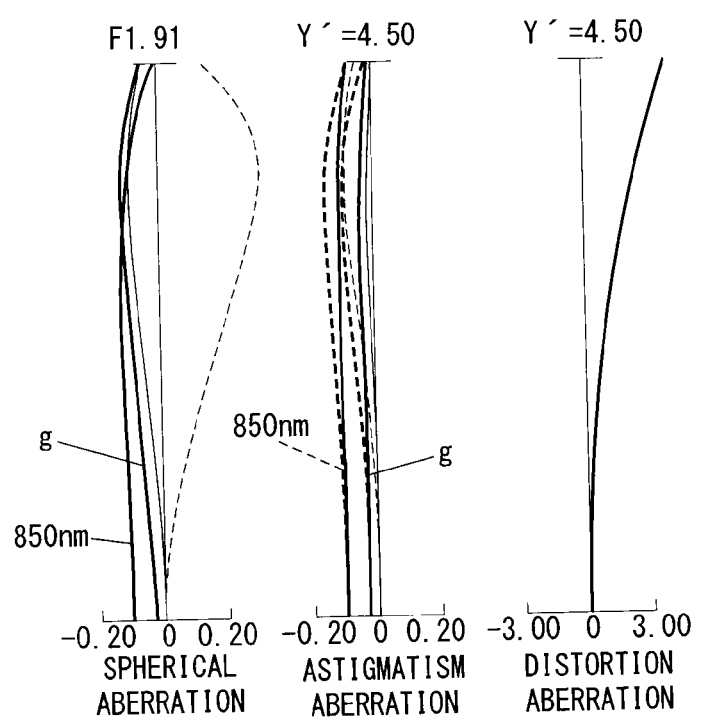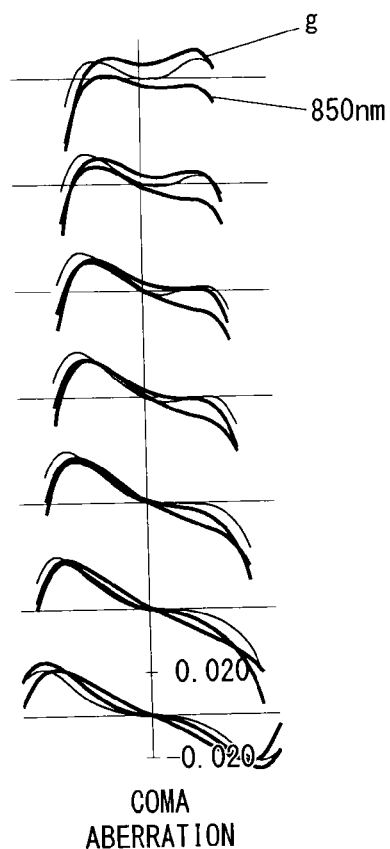
TELEPHOTO END

FIG.14
WIDE-ANGLE END
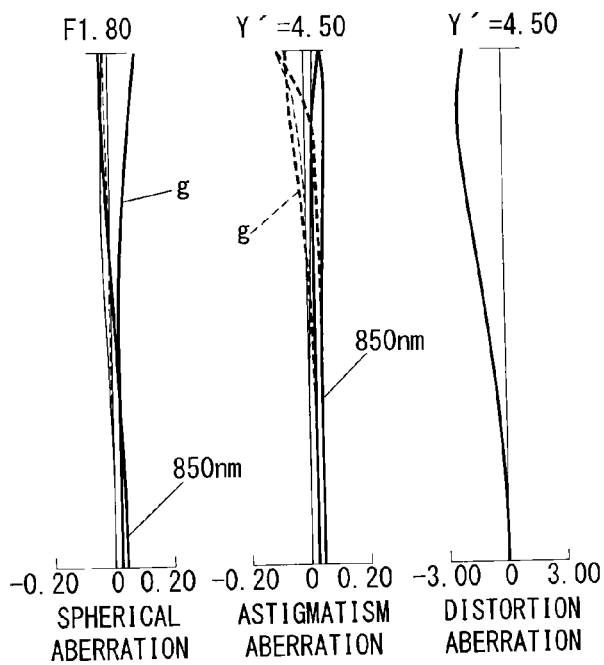
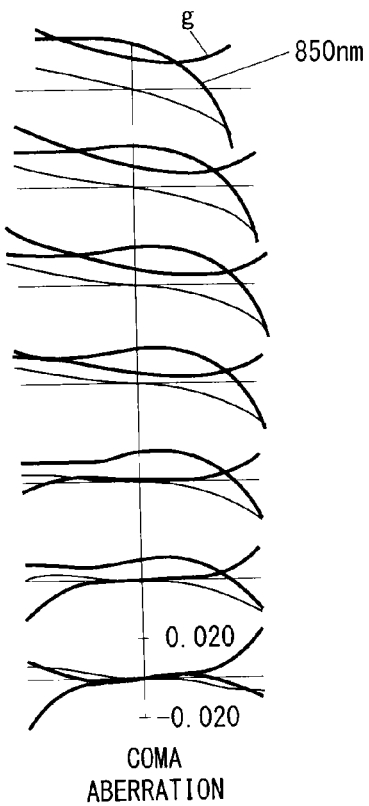
FIG.15
INTERMEDIATE FOCAL LENGTH
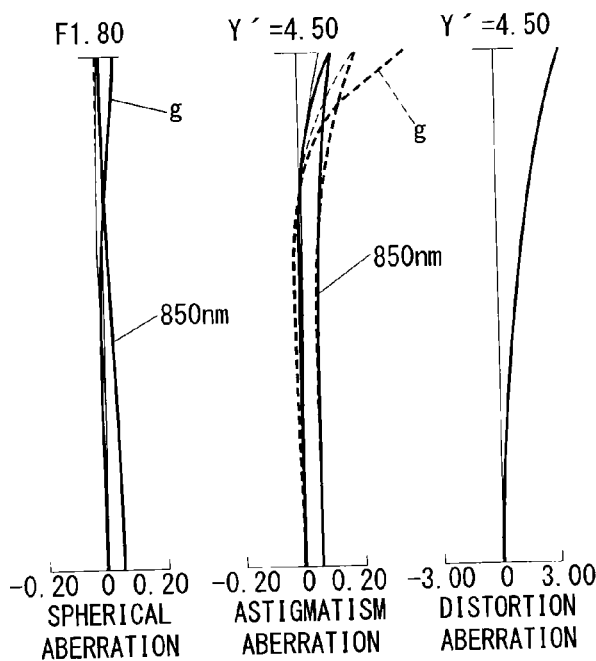
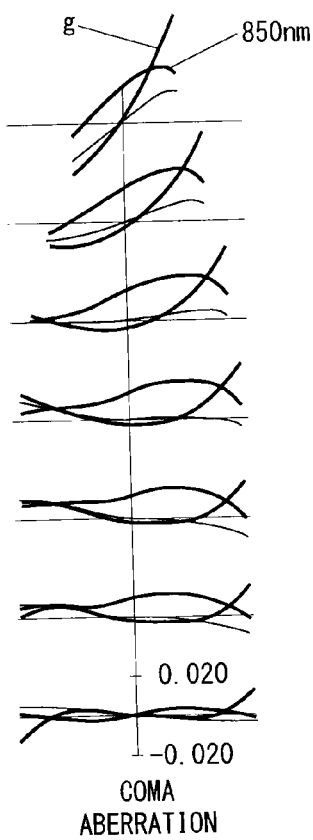

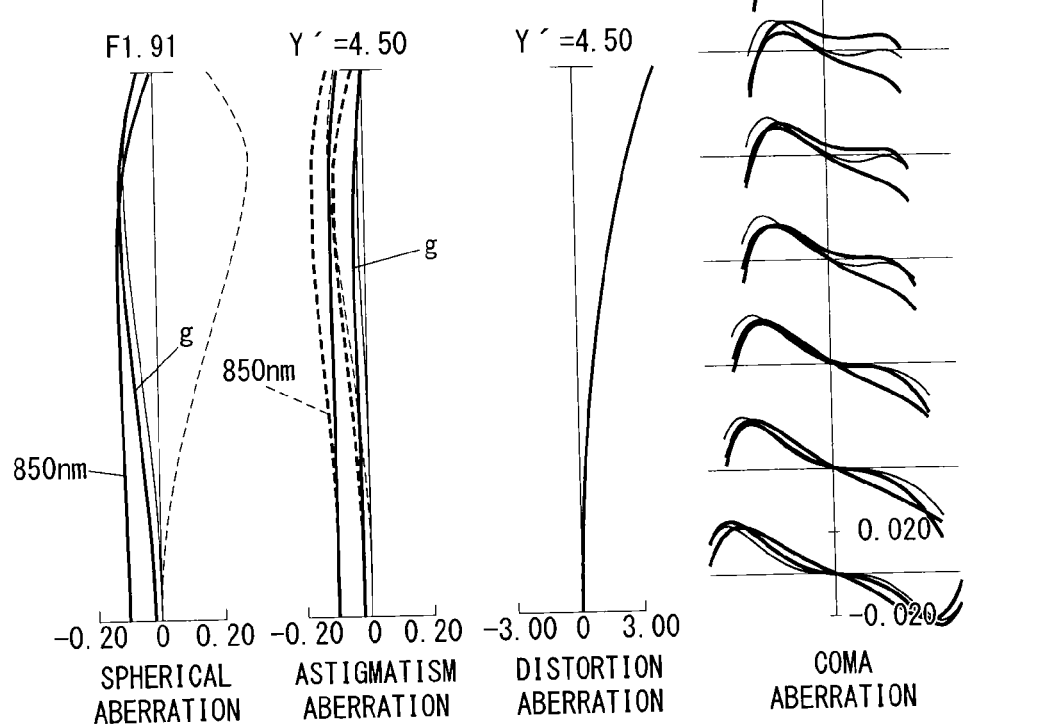

ZOOM LENS UNIT AND IMAGING APPARATUS

CROSS-REFERENCE TO RELATED APPLICATIONS

The present application is based on and claims priority from Japanese Patent Application Number 2014-29568, filed on Feb. 19, 2014, the disclosure of which is hereby incorporated by reference herein in its entirety.

BACKGROUND

The present invention relates to a zoom lens unit used for a television camera, a video camera, or a digital camera, specifically to a zoom lens unit for a monitoring system as well as an imaging apparatus with the zoom lens unit.

In recent years, a market of imaging devices (e.g., cameras) used for a security usage, etc. has grown, and requests or/and requirements from users are being various and diversified. Yet, most of the users demand a camera with high image quality (resolution) and high magnification ratio, and it is highly important to achieve both of the high image resolution (high image resolving power) and high magnification ratio for zoom lens units used as photographing lenses.

To achieve the high image resolution, the zoom lens unit should have a resolving power compatible with the image pickup element of at least 1,000,000 to 5,000,000 pixels in the entire zooming range. Further, for the high magnification ratio, the zoom lens unit should have a magnification ratio of approximately 16 times.

Additionally, it is desirable that aberrations of the lens are sufficiently corrected in the near infrared region (i.e., in a range where the light wavelength is equal to or shorter than around 900 nm), thereby enabling photographing in a dark place.

Conventionally, several zoom lens units have been developed. For example, Japanese Laid-Open Patent Applications No. 1985(Sho60)-126618 (Document 1), No. 1986(Sho61)-204610 (Document 2), and No. 1992(Hei04)-88310 (Document 3) teach zoom lens units that include, in order from an object side to an image side, a first lens group with positive refractive power, a second lens group with negative refracting power, a third lens group with negative refracting power, and a fourth lens group with positive refractive power having an anomalous dispersion glass; and the first lens group includes, in order from the object side to the image plane side, a cemented lens composed of a negative lens and a positive lens, a positive lens, and another positive lens.

The zoom lens units disclosed in Documents 1 to 3 may achieve high magnification ratio, large aperture (large diameter), and temperature resistance. In contrast, those Documents keep silent regarding the aberrations correction in the near infrared region.

SUMMARY

An object of the embodiments of the present invention is, therefore, to provide a zoom lens unit which has a high magnification ratio and corrects aberrations of lenses even in the near infrared region sufficiently.

To achieve the object, one aspect of embodiments of the present invention provides a zoom lens unit comprising, in order from an object side to an image plane side, a first lens group with positive refractive power, a second lens group with negative refractive power, a third lens group with negative refractive power, and a fourth lens group with positive refractive power; wherein the first lens group and the fourth lens group are fixed relative to the image plane, while the second lens group moves toward the image plane side and the third lens group moves when changing a magnification ratio from a wide-angle end to a telephoto end, the fourth lens group includes a resin lens with negative refractive power and at least one positive lens, and at least one of said positive lenses fulfils conditions (1), (2), and (3):

$$1.40 < n_d < 1.65 \quad (1)$$

$$65.0 < v_d < 100.0 \quad (2)$$

$$0.015 < P_{g,F} - (-0.001802 \times v_d + 0.6483) < 0.060 \quad (3)$$

where $n_d$ represents a refractive index of the positive lens, $v_d$ represents an Abbe number of the positive lens, and $P_{g,F}$ represents a partial dispersion ratio of the positive lens and is expressed by: $P_{g,F} = (n_g - n_F)/(n_F - n_C)$, where $n_g$, $n_F$, and $n_C$ represent refractive indexes at g-line, F-line, and C-line of the positive lens respectively.

BRIEF DESCRIPTION OF THE DRAWINGS

FIG. 1 is a cross-section view illustrating arrangements of a zoom lens unit at a short focal length end (wide-angle end), an intermediate focal length, and a long focal length end (telephoto end) according to Embodiment 1;

FIG. 2 is a cross-section view illustrating arrangements of a zoom lens unit at a short focal length end (wide-angle end), an intermediate focal length, and a long focal length end (telephoto end) according to Embodiment 2;

FIG. 3 is a cross-section view illustrating arrangements of a zoom lens unit at a short focal length end (wide-angle end), an intermediate focal length, and a long focal length end (telephoto end) according to Embodiment 3;

FIG. 4 is a cross-section view illustrating arrangements of a zoom lens unit at a short focal length end (wide-angle end), an intermediate focal length, and a long focal length end (telephoto end) according to Embodiment 4;

FIG. 5 shows graphs drawing aberrations curves at the wide-angle end of the zoom lens unit according to Embodiment 1;

FIG. 6 shows graphs drawing aberrations curves at the intermediate focal length of the zoom lens unit according to Embodiment 1;

FIG. 8 shows graphs drawing aberrations curves at the wide-angle end of the zoom lens unit according to Embodiment 2;

FIG. 9 shows graphs drawing aberrations curves at the intermediate focal length of the zoom lens unit according to Embodiment 2;

FIG. 11 shows graphs drawing aberrations curves at the wide-angle end of the zoom lens unit according to Embodiment 3;

FIG. 12 shows graphs drawing aberrations curves at the intermediate focal length of the zoom lens unit according to Embodiment 3;

FIG. 13 shows graphs drawing aberrations curves at the telephoto end of the zoom lens unit according to Embodiment 3;

FIG. 14 shows graphs drawing aberrations curves at the wide-angle end of the zoom lens unit according to Embodiment 4;

FIG. 15 shows graphs drawing aberrations curves at the intermediate focal length of the zoom lens unit according to Embodiment 4;

FIG. 16 shows graphs drawing aberrations curves at the telephoto end of the zoom lens unit according to Embodiment 4;

DETAILED DESCRIPTION OF THE PREFERRED EMBODIMENTS

Figure 7:
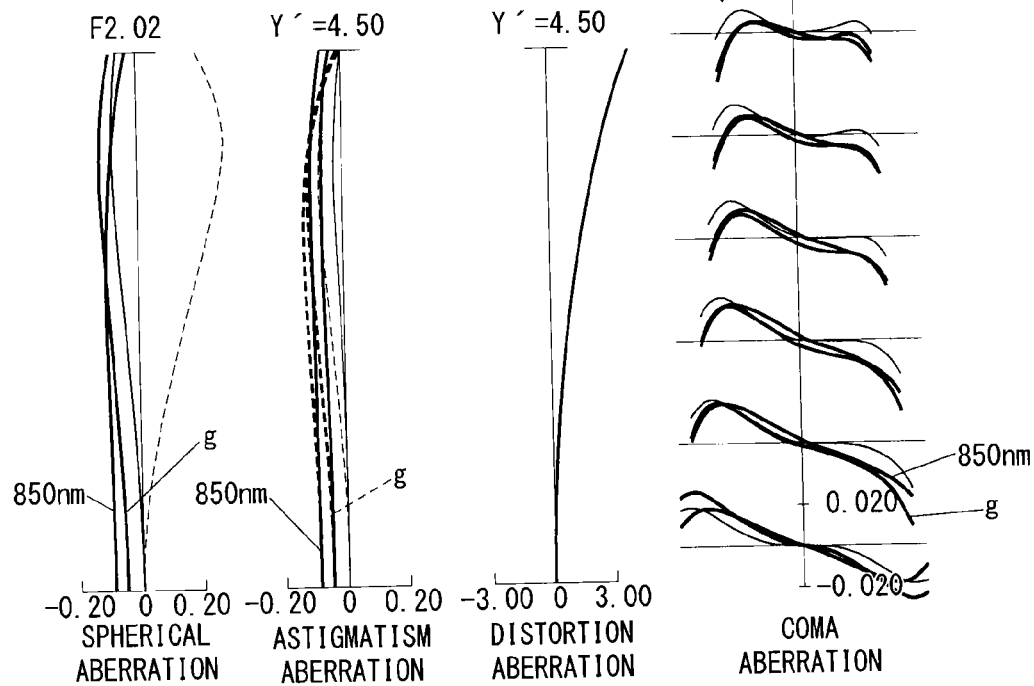
FIG. 7 shows graphs drawing aberrations curves at the telephoto end of the zoom lens unit according to Embodiment 1.

Hereinafter, zoom lens units according to embodiments of the present invention will be explained with reference to the drawings. As shown in FIGS. 1 to 4, a zoom lens unit 1 according to any of embodiments of this invention includes, in order from an object side (left side in the drawings) to a side of an age plane IP (right side in the drawings), a first lens group G1 with positive refractive power, a second lens group G2 with negative refractive power, a third lens group G3 with negative refractive power, and a fourth lens group G4 with positive refractive power. The first lens group G1 and the fourth lens group G4 are fixed relative to the image plane IP while the second lens group G2 moves toward the image side and the third lens group moves toward the image side or the object side when changing (adjusting) a magnification ratio of the zoom lens unit from a short focal length end (wide-angle end) to a long focal length end (telephoto end).

In a zoom lens unit having four lens groups with positive, negative, negative and positive refractive power, the second lens group G2 may function as a variator lens, which plays a leading role for changing the magnification ratio. Since the first to fourth lens groups are configured as explained above, an interval between the first lens group G1 and second lens group G2 increases and an interval between the second lens group G2 and third lens group G3 decreases when changing the magnification ratio from the wide-angle end to the telephoto end.

The fourth lens group G4 may include an optical material with anomalous dispersion property and correct an axial chromatic aberration at the wide-angle end. The fourth lens group G4 includes a fourth front lens group G4a which is disposed on the object side than a position where a gap between the lenses in the fourth lens group G4 is the widest, and a fourth latter lens group G4b which is disposed on the image side than the position of the widest gap. Since the fourth front lens group G4a has the largest effective diameter of luminous flux in the fourth lens group G4, the optical material with anomalous dispersion property, which is included in the fourth front lens group G4a, can efficiently correct the axial chromatic aberrations.

The fourth lens group G4 of the zoom lens unit 1 according to any of the embodiments of the present invention includes one resin lens (such as a plastic lens) with negative refractive power and at least one positive lens (for example, lenses L4a1, L4a2, L4a3, L4a6, and L4b2 illustrated in FIG. 1). At least one of the positive lenses in the fourth lens group G4 fulfills the following conditions (1), (2), and (3):

$$1.40 < n_d < 1.65 \tag{1}$$

$$65.0 < v_d < 100.0 \tag{2}$$

$$0.015 < P_{g,F} - (-0.001802 \times v_d + 0.6483) < 0.060 \tag{3}$$

where $n_d$ represents a refractive index of the positive lens, $v_d$ represents an Abbe number of the positive lens, and $P_{g,F}$ represents a partial dispersion ratio of the positive lens and is expressed by: $P_{g,F} = (n_g - n_F)/(n_F - n_C)$, where $n_g$, $n_F$, and $n_C$ represent refractive indexes at g-line, F-line, and C-line of the positive lens respectively.

It becomes possible to sufficiently correct chromatic aberrations by using an optical material that can fulfill the conditions (1) (2) and (3) (i.e., the optical material having high (strong) anomalous dispersion property with low dispersion property) for at least one of the positive lenses in the fourth lens group G4. However, optical materials having anomalous dispersion property have a characteristic of a high linear expansion coefficient and a high change rate of refractive index against a temperature change. Thus, the focal position changes as temperature changes. To overcome this disadvantage, the negative lens L4a5 in the fourth lens group according to the embodiments is made of a resin lens. Since a resin lens also has a characteristic of a high linear expansion coefficient and a high change rate of refractive index against a temperature change, the negative lens made of resin can compensate the change in the focal position of the optical material (positive lens) having anomalous dispersion property.

Note that correction of monochromatic aberrations (Seidel aberrations) becomes insufficient if $n_d$ in the condition (1) is equal to or smaller than the corresponding lower limit value, correction of chromatic aberrations becomes insufficient if $v_d$ in the condition (2) is equal to or smaller than the corresponding lower limit value, and correction of chromatic aberrations for secondary spectrum becomes insufficient if $P_{g,F}$ is equal to or smaller than the corresponding lower limit value. On the other hand, an optical material whose values surpass every upper limit value in conditions (1), (2), and (3) may not technically or economically be practical.

For a monitoring camera, etc., users demand a zoom lens unit that has resolving power compatible with the image pickup element of at least 1,000,000 to 5,000,000 pixels and a high magnification ratio of approximately 16 times. It is desirable that aberrations of the lens are sufficiently corrected even in the near infrared region (i.e., in a range where the light wavelength is equal to or shorter than around 900 nm), thereby enabling photographing in a dark place. Also, users demand a wider angle lens unit in which a half-field angle (half view angle) exceeds 25 degrees at the wide-angle end. Further, since a security camera, etc. may be used under a high temperature circumstance, it is desirable to have high thermostability. It is also desirable to provide a large diameter lens unit having an F-number equal to or smaller than 2.0 at the wide-angle end.

The zoom lens unit 1 configured as above has the magnification ratio of about 16 times, the half-field angle of about 30 degrees at the wide-angle end, the F-number at the wide-angle end equal to or smaller than 2.0, and the F-number at the telephoto end around 2.0. Also, the zoom lens unit 1 includes about 16 lenses at a relatively low cost, sufficiently corrects aberrations even in the near infrared region, and has a high resolving power compatible with the image pickup element of at least 1,000,000 to 5,000,000 pixels in the entire zooming range. Consequently, a camera with the zoom lens unit 1 becomes a compact and high quality (high resolution) camera and provides an enough magnification ratio for a normal imaging range.

Specific embodiments of the invention will now be explained. To correct each aberration and compensate a change in a focal position caused by a temperature change, the zoom lens unit 1 according to embodiments of the present invention should arrange the fourth lens group G4 to fulfil the following condition (4):

$$-12.0 < f_{\_pla}/f_4 < -3.0 \quad (4)$$

where $f_{\_pla}$ represents a focal length of the resin lens L4a5 in the fourth lens group G4, and $f_4$ represents a focal length of the fourth lens group G4.

The zoom lens unit 1 with the fourth lens group G4 fulfilling the condition (4) can compensate the change in the focal position and thus provide a high quality imaging apparatus with a high thermostability. Note that the compensation of the change in the focal position, which occurs in the anomalous dispersion lens, becomes excessive if $f_{\_pla}/f_4$ in the condition (4) is equal to or greater than the upper limit value. On the other hand, the compensation of the change in the focal position becomes insufficient if $f_{\_pla}/f_4$ in the condition (4) is equal to or smaller than the lower limit value.

Each aberration can be corrected more efficiently if the fourth lens group of the zoom lens unit 1 fulfils the following condition (4'):

$$-10.0 < f_{\_pla}/f_4 < -5.0 \quad (4')$$

It is even preferable to fulfil the following condition (5) for the zoom lens unit 1 according to the embodiments of this present invention:

$$-30 < f_{\_pla}/f_w < -10 \quad (5)$$

where $f_w$ represents a total focal length of the optical system at the wide-angle end.

The zoom lens unit 1 can correct the axial chromatic aberrations more sufficiently by fulfilling the condition (5), and thus provide a high quality imaging apparatus that can obtain a fine image from the visible region to the near infrared region. Note that the compensation of the change in the focal position, which occurs in the anomalous dispersion lens, becomes excessive if $f_{\_pla}/f_w$ in the condition (5) is equal to or greater than the upper limit value. On the other hand, the compensation of the focal position becomes insufficient if $f_{\_pla}/f_w$ in the condition (5) is equal to or smaller than the lower limit value.

The axial chromatic aberrations can be corrected more sufficiently if the first lens group G1 includes a diffraction lens surface and fulfils the following condition (6):

$$50 < f_{1doe}/f_1 < 200 \quad (6)$$

where $f_{1doe}$ represents a focal length of the diffraction lens surface, and $f_1$ represents a focal length of the first lens group G1.

Specifically, the first lens group G1 should include a diffraction lens surface to correct the axial chromatic aberration at the telephoto end more efficiently since an axial light beam (collimated beam of light) passing through the first lens group G1 is the highest (largest) among the axial light beams passing through the lens groups at the telephoto end. Further, the zoom lens unit 1 fulfilling (6) can correct the axial chromatic aberrations at the telephoto end more sufficiently.

To provide a compact and high quality zoom lens unit 1 with a large diameter, the zoom lens unit 1 should arrange the fourth lens group G4 to include a fourth front lens group G4a disposed on the object side than a position where a gap between lenses in the fourth lens group G4 is the widest, and a fourth latter lens group G4b disposed on the image side than the position of the widest gap. To sufficiently correct the axial chromatic aberrations at the wide-angle end, at least two of positive lenses in the fourth front lens group G4a should fulfill the conditions (1) to (3). Preferably, all of the positive lenses in the fourth front lens group G4a fulfil the conditions (1) to (3). With this, the zoom lens unit 1 can correct the axial chromatic aberrations sufficiently and thus provide a high quality imaging apparatus that can obtain a fine image from the visible light range to the infrared ray region.

The configuration of the lenses in the fourth front lens group G4a is especially important to achieve a larger diameter. For example, the zoom lens unit 1 may arrange the fourth front lens group G4a to include, in order from the object side to the side of the image plane IP, a first positive lens L4a1, a second positive lens L4a2, a third positive lens L4a3, a first negative lens L4a4, a second negative resin lens L4a5, and a fourth positive lens L4a6, as shown in FIG. 1.

The fourth front lens group G4a aligned as explained above can correct aberrations sufficiently through the plural positive lenses as having a large diameter lens. Further, the fourth front lens group G4a can compensate the change in the focal position and correct the aberrations by the negative resin lens L4a5 and the negative lens L4a4. Consequently, it becomes possible to provide a high performance zoom lens unit 1 and a high quality imaging apparatus with a high resolving power.

The zoom lens unit 1 according to the embodiments of the present invention should fulfil the following condition (7) to achieve a higher performance:

$$0.2 < D_{4a}/D_4 < 0.4 \quad (7)$$

where $D_{4a}$ represents the widest gap in the fourth lens group G4, and $D_4$ represent thickness (length) of the fourth lens group.

It becomes possible to provide a zoom lens unit 1 with an even higher performance and a high quality imaging apparatus with a higher resolving power by fulfilling the condition (7). Note that the fourth front lens group G4a and the fourth latter lens group G4b balance the aberrations correction as having a relatively large gap (i.e., the gap $D_{4a}$). Correction of the aberrations becomes insufficient if $D_{4a}/D_4$ in the condition (7) becomes equal to or greater than the upper limit value. On the other hand, the aberrations correction loses the balance if $D_{4a}/D_4$ in the condition (7) becomes equal to or smaller than the lower limit value (i.e., if the gap $D_{4a}$ becomes too small).

The zoom lens unit 1 according to the embodiments of the present invention should fulfill the following conditions (8) and (9) to provide a higher performance zoom lens unit 1 and to achieve a higher quality imaging apparatus with a higher resolution:

$$0.6 < f_1/f_t < 0.9 \quad (8)$$

$$0.1 < f_4/f_t < 0.3 \quad (9)$$

where $f_1$ represents a focal length of the first lens group G1, and $f_t$ represents a total focal length of the optical system at the telephoto end.

The zoom lens unit 1 can correct aberrations for the whole zooming range by fulfilling the conditions (8) and (9). Note that the focal length $f_1$ of the first lens group G1 becomes excessively long and movements of the second lens group G2, which is used for changing the magnification ratio, becomes large (i.e., the size of the zoom lens unit 1 becomes large disadvantageously) if $f_1/f_t$ in the condition (8) is equal to or larger than the corresponding upper limit value. On the other hand, the focal length $f_1$ of the first lens group G1 becomes excessively short, so that the correction of aberrations in the first lens group G1 becomes insufficient if $f_1/f_t$ in the condition (8) is equal to or smaller than the corresponding lower limit value. Further, an overall length of the lens unit 1 becomes relatively long (i.e., the size of the zoom lens unit 1 becomes relatively large) if $f_4/f_t$ in the condition (9) is equal to or greater than the corresponding upper limit value. On the other hand, the correction of aberrations in the first lens group G4 becomes insufficient if $f_4/f_t$ in the condition (9) is equal to or smaller than the corresponding lower limit value.

The zoom lens unit 1 according to the embodiments of the present invention may perform focusing adjustments by the first lens group G1. Adjusting the focus through the first lens group G1 can reduce focus fluctuation while changing the zoom positions. Further, adjusting the focus through the first lens group G1 can reduce a moving amount for adjusting the focus in response to a change in focal position caused by a temperature change at the telephoto end, and thus can provide a zoom lens unit 1 whose focal position is stable for the whole zooming range and an imaging apparatus in which adjustment the focus in response to the change in the zoom position can be avoidable.

Light amount (exposure amount) may be adjusted by using the aperture stop AS of the zoom lens unit 1 according to the embodiments of the invention. However, using the ND filter, etc. for adjusting the light amount without substantially changing the diameter of the aperture stop AS can advantageously suppress lowering of resolving power caused by diffraction phenomenon.

The imaging apparatus according to the embodiments of the present invention includes the zoom lens unit 1 as an imaging optical system for still images. In the zoom lens unit 1, a magnification ratio is about 16, the half-field angle is about 30 degree at the wide-angle end, the F-number at the wide-angle end is equal to or smaller than about 2.0, and the F-number at the telephoto end thereof is about 2.0. Also, the zoom lens unit 1 is configured to be compact and include about 16 lenses at a relatively low cost. Further, the zoom lens unit 1 sufficiently corrects aberrations even in the near infrared region, and has a high resolving power compatible with the image pickup elements of at least 1,000,000 to 5,000,000 pixels in the entire zooming range. Using the zoom lens unit 1 for the imaging optical system can provide a compact and high quality imaging apparatus, whereby users can take a high quality image using the imaging apparatus that is easy to carry.

The imaging apparatus according to the embodiments of the present invention includes the zoom lens unit 1 as an imaging optical system of videos. The zoom lens unit 1 has a magnification ratio of about 16, the half-field angle of about 30 degree at the wide-angle end, the F-number at the wide-angle end equal to or smaller than 2.0, and the F-number at the telephoto end thereof is about 2.0. Also, the zoom lens unit 1 is configured to be compact and include about 16 lenses at a relatively low cost. Further, the zoom lens unit 1 sufficiently corrects aberrations even in the near infrared region, and has a high resolving power compatible with the image pickup elements of at least 1,000,000 to 5,000,000 pixels in the entire zooming range. Using the zoom lens unit 1 for the imaging optical system for videos can provide a compact and high quality imaging apparatus, whereby a user of the apparatus can take a high quality image using the imaging apparatus that is easy to carry.

Each embodiment of the present invention will now be explained with reference to the drawings. FIGS. 1 to 4 show cross-section views illustrating arrangements of the zoom lens unit 1 according to Embodiments 1 to 4 respectively. As illustrated, the zoom lens unit 1 according to Embodiments 1 to 4 includes, in order from an object side to a side of an image plane IP, a first lens group G1 with positive refractive power, a second lens group G2 with negative refractive power, a third lens group G3 with negative refractive power, and a fourth lens group G4 with positive refractive power. The first lens group G1 and the fourth lens group G4 are fixed relative to the image plane IP, while the second lens group G2 moves toward the image side and the third lens group moves toward the image side or the object side when changing (adjusting) a magnification ratio of the zoom lens unit 1 from a short focal length end (wide-angle end) to a long focal length end (telephoto end). Accordingly, an interval between the first lens group G1 and second lens group G2 increases and an interval between the second lens group G2 and third lens group G3 decreases when changing the magnification ratio from the wide-angle end to the telephoto end.

In the zoom lens unit 1 according to Embodiments 1 to 4, an optical element illustrated as a parallel flat plate, which is disposed at the side of the image plane IP, corresponds to an optical filter (e.g., an optical low pass filter or a ultraviolet cut-off filter) or a cover glass (sealing glass) of an image pickup element (e.g., a complementary metal-oxide semiconductor (CMOS) imaging sensor or a charge-coupled device (CCD) imaging sensor). In the drawings, a filter FG is shown as an equivalent transparent parallel flat plate of the optical element. An optical element composed of another parallel flat plate, which is disposed between the object and an aperture stop AS or between the image plane IP and aperture stop AS, corresponds to an ND filter F, which is used for adjusting light amount (exposure amount).

Note that optical glasses are mentioned by the names of their manufacture, OHARA Inc., or HOYA corp. Except for a resin lens L4a5, lenses are all optical lenses in the embodiments, but they can be resin lenses instead.

The zoom lens unit 1 according to any of Embodiments 1 to 4 is configured such that aberrations are sufficiently corrected and is configured to have a resolving power compatible with the image pickup devices of 1,000,000 to 5,000,000 pixels or more. The zoom lens unit 1 according to any of Embodiments 1 to 4 can achieve compactness and high imaging performance as clearly explained and illustrated.

Symbols commonly used in the Embodiments 1 to 4 represent as follows:
  f: a total focal length of the optical system,
  F: F-number,
  ω: half-field angle,
  R: curvature radius (a paraxial curvature radius for aspherical surface),
  d: distance (an interval) between lens surfaces,
  $n_d$: refractive index,
  $v_d$: abbe number,
  C2: coefficient of 2nd order in a phase function,
  C4: coefficient of 4th order in a phase function, Wide: wide-angle end (short focal length end),
Mean: intermediate focal length, and
Tele: telephoto end (long focal length end).

Curvature radius R=∞ represents a flat surface, and a lens surface number marked with an asterisk "*", i.e., surface number 2 (second surface: a cemented surface of a negative lens L11 and a positive lens L12) represents a diffraction lens surface. A focal length of the diffraction lens $f_{1doe}$ is expressed by:

$$f_{1doe} = -1(2 \times C2).$$

A phase function is expressed by:

$$\phi(h) = (2\pi/\lambda d)(C2 \cdot h^2 + C4 \cdot h^4)$$

where λd represents a reference wavelength (d-line), h represents a height from the optical axis, and φ(h) represents a phase.

Arrangements of the zoom lens unit 1 according to Embodiments 1 to 4 are now specifically explained. As illustrated in FIGS. 1 to 4, the first lens group G1 includes, in order from the object side to the side of the image plane IP, a negative meniscus lens L11 having a concave surface on the image side, a positive biconvex lens L12 having a larger convex surface on the object side (i.e., the curvature radius on the object side of the positive biconvex lens L12 is larger than the curvature radius of the image side thereof), and a positive meniscus lens L13 having a convex surface on the object side. The negative lens L11 and the positive lens L12 in the first lens group G1 are closely contacted and bonded to each other to form a cemented lens. A laminated type diffraction optical element is adhered to the cemented surface of the negative lens L11 and positive lens L12 in the first lens group G1.

The second lens group G2 includes, in order from the object side to the side of the image plane IP, a negative meniscus lens L21 having a concave surface on the image side, a negative biconcave lens L22 having a larger concave surface on the image side (i.e., the absolute value of the curvature radius on the image side of the negative biconcave lens L22 is larger than the absolute value of the curvature radius on the object side thereof), and a positive meniscus lens L23 having a convex surface on the object side. The negative lens L22 and the positive lens L23 in the second lens group G2 are closely contacted and bonded to each other to form a cemented lens.

The third lens group G3 includes, in order from the object side, a negative biconcave lens L31 having a larger concave surface on the object side (i.e., the absolute value of the curvature radius on the object side of the negative biconcave lens L31 is larger than the absolute value of the curvature radius on the image side thereof), and a positive biconvex lens L32 having a larger convex surface on the object side (i.e., the curvature radius on the object side of the positive biconvex lens L32 is larger than the curvature radius on the image side thereof). The negative lens L31 and the positive lens L32 in the third lens group G3 are closely contacted and bonded to each other to form a cemented lens.

The fourth lens group G4 includes a fourth front lens group G4a which is disposed on the object side than a position where a gap between the lenses in the fourth lens group G4 is the widest (the widest gap is shown as $D_{4a}$ in FIGS. 1 to 4), and a fourth latter lens group G4b which is disposed on the image side than the position of the widest gap $D_{4a}$. The fourth front lens group G4a includes, in order from the object side to the side of the image plane IP, a positive biconvex lens L4a1 having a larger convex surface on the image side (i.e., the curvature radius on the image side of the positive biconvex lens L4a1 is larger than the curvature radius on the object side thereof), a positive biconvex lens L4a2 having a larger convex surface on the object side (i.e., the curvature radius on the object side of the positive biconvex lens L4a2 is larger than the curvature radius on the image side thereof), a positive biconvex lens L4a3 having a larger convex surface on the image side (i.e., the curvature radius on the image side of the positive biconvex lens L4a3 is larger than the curvature radius on the object side thereof), a negative meniscus lens L4a4 having a concave surface on the image side, a negative lens L4a5 made of resin (resin lens), and a positive biconvex lens L4a6 having a larger convex surface on the object side (i.e., the curvature radius on the object side of the positive biconvex lens L4a6 is larger than the curvature radius on the image side thereof). The positive lens L4a3 and the negative lens L4a4 in the fourth front lens group G4a are closely contacted and bonded to each other to form a cemented lens. The resin lenses L4a5 in Embodiments 1 and 2 are a plano-concave lens having a concave surface on the object side, while the resin lenses L4a5 in Embodiments 3 and 4 are a negative meniscus lens having a concave surface on the object side.

The fourth latter lens group G4b includes, in order from the object side to the side of the image plane IP, a negative meniscus lens L4b1 having a concave surface on the image side, and a positive biconvex lens L4b2 having a larger convex surface on the object side (i.e., the curvature radius on the object side of the positive biconvex lens L4b2 is larger than the curvature radius on the image side thereof).

An aperture stop AS and an ND filter F are disposed between the third lens group G3 and fourth lens group G4, and are integrally supported together with the fourth lens group G4. The zoom lens unit 1 according to Embodiments 1 and 4 disposes the aperture stop AS on the object side and the ND filter F on the image side, as illustrated in FIGS. 1 and 4. The zoom lens unit 1 according to Embodiments 2 and 3 disposes the aperture stop AS on the image side and the ND filter F on the object side, as illustrated in FIGS. 2 and 3.

Embodiment 1

A numerical example according to Embodiment 1 illustrated in FIG. 1 is shown below. Table 1 shows optical characteristics of each optical element, and Table 2 shows coefficients C2 and C4 in the phase function.

TABLE 1

| LENS SURFACE | R | D | $N_d$ | $v_d$ | Glass |
|---|---|---|---|---|---|
| 1 | 135.306 | 2.50 | 1.74950 | 35.33 | S-NBH51 (OHARA) |
| 2* | 55.224 | 15.14 | 1.58913 | 61.13 | S-BAL35 (OHARA) |
| 3 | −511.378 | 0.50 | | | |
| 4 | 51.934 | 9.18 | 1.49700 | 81.54 | S-FPL51 (OHARA) |
| 5 | 231.955 | A | | | |
| 6 | 179.606 | 1.50 | 1.90366 | 31.31 | TAFD25 (HOYA) |
| 7 | 15.178 | 7.32 | | | |
| 8 | −36.694 | 1.20 | 1.48749 | 70.24 | S-FSL5 (OHARA) |
| 9 | 20.512 | 4.29 | 1.92286 | 20.88 | E-FDS1 (HOYA) |
| 10 | 87.171 | B | | | |
| 11 | −26.226 | 1.20 | 1.78800 | 47.37 | S-LAH64 (OHARA) |
| 12 | 86.152 | 2.29 | 1.92286 | 18.90 | S-NPH2 (OHARA) |
| 13 | −234.050 | C | | | |
| 14 | AS | 0.50 | | | |
| 15 | ∞ | 0.80 | 1.51633 | 64.14 | S-BSL7 (OHARA) |
| 16 | ∞ | 0.50 | | | |
| 17 | 893.200 | 3.96 | 1.49700 | 81.54 | S-FPL51 (OHARA) |
| 18 | −23.214 | 0.50 | | | |

TABLE 1-continued

| LENS SURFACE | R | D | $N_d$ | $v_d$ | Glass |
|---|---|---|---|---|---|
| 19 | 65.296 | 3.22 | 1.49700 | 81.54 | S-FPL51 (OHARA) |
| 20 | −68.631 | 0.50 | | | |
| 21 | 30.807 | 5.11 | 1.49700 | 81.54 | S-FPL51 (OHARA) |
| 22 | −25.482 | 1.20 | 1.90366 | 31.31 | TAFD25 (HOYA) |
| 23 | −300.108 | 0.89 | | | |
| 24 | −77.083 | 1.20 | 1.53110 | 56.00 | ZEONEX E48R |
| 25 | ∞ | 0.50 | | | |
| 26 | 17.000 | 3.92 | 1.49700 | 81.54 | S-FPL51 (OHARA) |
| 27 | 218.016 | 8.92 | | | |
| 28 | 23.382 | 1.20 | 1.83481 | 42.72 | S-LAH55V (OHARA) |
| 29 | 9.717 | 1.83 | | | |
| 30 | 25.748 | 2.93 | 1.54814 | 45.78 | S-TIL1 (OHARA) |
| 31 | −30.657 | 11.00 | | | |
| 32 | ∞ | 2.70 | 1.51633 | 64.14 | S-BSL7 (OHARA) |
| 33 | ∞ | | | | |

TABLE 2

| LENS SURFACE | $\lambda$ ($\lambda_d$) | $C_2$ | $C_4$ |
|---|---|---|---|
| 2* | 587.6 | −4.29310E−05 | 9.94175E−09 |

A total focal length f of the optical system, F-number, half-field angle ω, an interval (distance) A between the first lens group G1 and second lens group G2, an interval (distance) B between the second lens group G2 and third lens group G3, an interval (distance) C between the third lens group G3 and the aperture stop AS change when zooming from the wide-angle end (WIDE) to the telephoto end (TELE). The following Table 3 shows those values in Embodiment 1.

TABLE 3

| | WIDE | MEAN | TELE |
|---|---|---|---|
| f | 7.72 | 29.99 | 116.37 |
| F-NUMBER | 1.84 | 1.83 | 2.02 |
| ω | 30.70 | 8.25 | 2.13 |
| A | 1.4990 | 39.8694 | 57.4791 |
| B | 56.1070 | 13.0119 | 3.4199 |
| C | 4.7944 | 9.5182 | 1.5000 |

Constant values for the positive lenses L4a1, L4a2, L4a3, and L4a6 (S-FPL51) in the conditions (1), (2), and (3) according to Embodiment 1 are:

$$n_d = 1.49700 \quad (1)$$

$$v_d = 81.54 \quad (2)$$

$$P_{g,F} - (-0.001802 \times v_d + 0.6483) = 0.036. \quad (3)$$

Constant values in the conditions (4) to (9) according to Embodiment 1 are:

$$f_{\_pla}/f_4 = -7.18 \quad (4)$$

$$f_{\_pla}/f_w = -18.81 \quad (5)$$

$$f_{1doe}/f = 130.30 \quad (6)$$

$$D_{4a}/D_4 = 0.25 \quad (7)$$

$$f_1/f_t = 0.77 \quad (8)$$

$$f_4/f_t = 0.17. \quad (9)$$

FIGS. 5 to 7 respectively show spherical aberration graphs, astigmatism aberration graphs, distortion aberration graphs, and coma aberration graphs at the wide-angle end, at the intermediate focal length, and at the telephoto end of the zoom lens unit 1 according to Embodiment 1. In the drawings, solid lines in the spherical aberration graphs represent spherical aberrations and dash lines therein represent a sine condition. The solid lines in the astigmatism aberration graphs represent sagittal aberrations and the dash lines therein represent meridional aberrations. The narrow (thin) lines in the coma aberration graphs represent aberrations of d-line (a reference wavelength) and the thick lines therein represent aberrations of g-line and a wavelength of 850 nm (λ=850 nm). Note that aberration graphs for other embodiments are drawn in the same manner.

As illustrated in FIGS. 5 to 7, the zoom lens unit 1 according to Embodiment 1 sufficiently corrects aberrations and has a high resolving power compatible with the image pickup element of 1,000,000 to 5,000,000 or more pixels in the entire zooming range. Consequently, the zoom lens unit 1 according to Embodiment 1 can achieve compactness and a high imaging performance.

Embodiment 2

A numerical example according to Embodiment 2 illustrated in FIG. 2 is shown below. Table 4 shows optical characteristics of each optical element, and Table 5 shows coefficients C2 and C4 in the phase function.

TABLE 4

| LENS SURFACE | R | D | $N_d$ | $v_d$ | Glass |
|---|---|---|---|---|---|
| 1 | 127.571 | 2.50 | 1.74950 | 35.33 | S-NBH51 (OHARA) |
| 2* | 53.637 | 14.81 | 1.58913 | 61.13 | S-BAL35 (OHARA) |
| 3 | −539.381 | 0.50 | | | |
| 4 | 51.161 | 9.01 | 1.49700 | 81.54 | S-FPL51 (OHARA) |
| 5 | 239.735 | A | | | |
| 6 | 184.214 | 1.50 | 1.90366 | 31.31 | TAFD25 (HOYA) |
| 7 | 14.711 | 7.14 | | | |
| 8 | −33.851 | 1.20 | 1.48749 | 70.24 | S-FSL5 (OHARA) |
| 9 | 19.969 | 4.20 | 1.92286 | 20.88 | E-FDS1 (HOYA) |
| 10 | 87.525 | B | | | |
| 11 | −26.101 | 1.20 | 1.78800 | 47.37 | S-LAH64 (OHARA) |
| 12 | 135.046 | 2.17 | 1.92286 | 18.90 | S-NPH2 (OHARA) |
| 13 | −219.603 | C | | | |
| 14 | ∞ | 0.80 | 1.51633 | 64.14 | S-BSL7 (OHARA) |
| 15 | ∞ | 0.50 | | | |
| 16 | AS | 0.50 | | | |
| 17 | 805.616 | 3.94 | 1.49700 | 81.54 | S-FPL51 (OHARA) |
| 18 | −23.641 | 0.50 | | | |
| 19 | 57.388 | 3.33 | 1.43875 | 94.94 | S-FPL53 (OHARA) |
| 20 | −71.184 | 0.50 | | | |
| 21 | 30.246 | 5.14 | 1.49700 | 81.54 | S-FPL51 (OHARA) |
| 22 | −27.036 | 1.20 | 1.85026 | 32.27 | TAFD25 (HOYA) |
| 23 | −136.019 | 0.96 | | | |
| 24 | −53.160 | 1.20 | 1.53110 | 56.00 | ZEONEX E48R |
| 25 | ∞ | 0.50 | | | |
| 26 | 17.000 | 3.90 | 1.49700 | 81.54 | S-FPL51 (OHARA) |
| 27 | 158.627 | 8.83 | | | |
| 28 | 23.062 | 1.20 | 1.83400 | 37.16 | S-LAH55V (OHARA) |
| 29 | 9.500 | 1.74 | | | |
| 30 | 22.374 | 2.90 | 1.54814 | 45.78 | S-TIL1 (OHARA) |
| 31 | −37.489 | 11.00 | | | |
| 32 | ∞ | 2.70 | 1.51633 | 64.14 | S-BSL7 (OHARA) |
| 33 | ∞ | | | | |

TABLE 5

| LENS SURFACE | λ ($\lambda_d$) | $C_2$ | $C_4$ |
|---|---|---|---|
| 2* | 587.6 | −4.59280E−05 | 1.02111E−08 |

A total focal length f of the optical system, F-number, half-field angle ω, an interval (distance) A between the first lens group G1 and second lens group G2, an interval (distance) B between the second lens group G2 and third lens group G3, an interval (distance) C between the third lens group G3 and the aperture stop AS change when zooming from the wide-angle end (WIDE) to the telephoto end (TELE). The following Table 6 shows those values in Embodiment 2.

TABLE 6

|  | WIDE | MEAN | TELE |
|---|---|---|---|
| f | 7.72 | 29.98 | 116.32 |
| F-NUMBER | 1.80 | 1.80 | 1.91 |
| ω | 30.68 | 8.23 | 2.13 |
| A | 1.5029 | 38.4771 | 55.3991 |
| B | 54.3131 | 12.6568 | 3.4233 |
| C | 4.5010 | 9.1885 | 1.5000 |

Constant values for the positive lenses L4a1, L4a3, and L4a6 (S-FPL51) in the conditions (1), (2), and (3) according to Embodiment 2 are:

$$n_d = 1.49700 \quad (1)$$

$$v_d = 81.54 \quad (2)$$

$$P_{g,F} - (-0.001802 \times v_d + 0.6483) = 0.036. \quad (3)$$

The constant values for the positive lenses L4a2 (S-FPL53) in the conditions (1), (2), and (3) according to Embodiment 2 are:

$$n_d = 1.43875 \quad (1)$$

$$v_d = 94.94 \quad (2)$$

$$P_{g,F} - (-0.001802 \times v_d + 0.6483) = 0.057. \quad (3)$$

Constant values in the conditions (4) to (9) according to Embodiment 2 are:

$$f_{-pla}/f_4 = -5.08 \quad (4)$$

$$f_{-pla}/f_w = -12.97 \quad (5)$$

$$f_{1doe}/f = 125.95 \quad (6)$$

$$D_{4d}/D_4 = 0.25 \quad (7)$$

$$f_1/f_t = 0.74 \quad (8)$$

$$f_4/f_t = 0.17. \quad (9)$$

Figure 10:
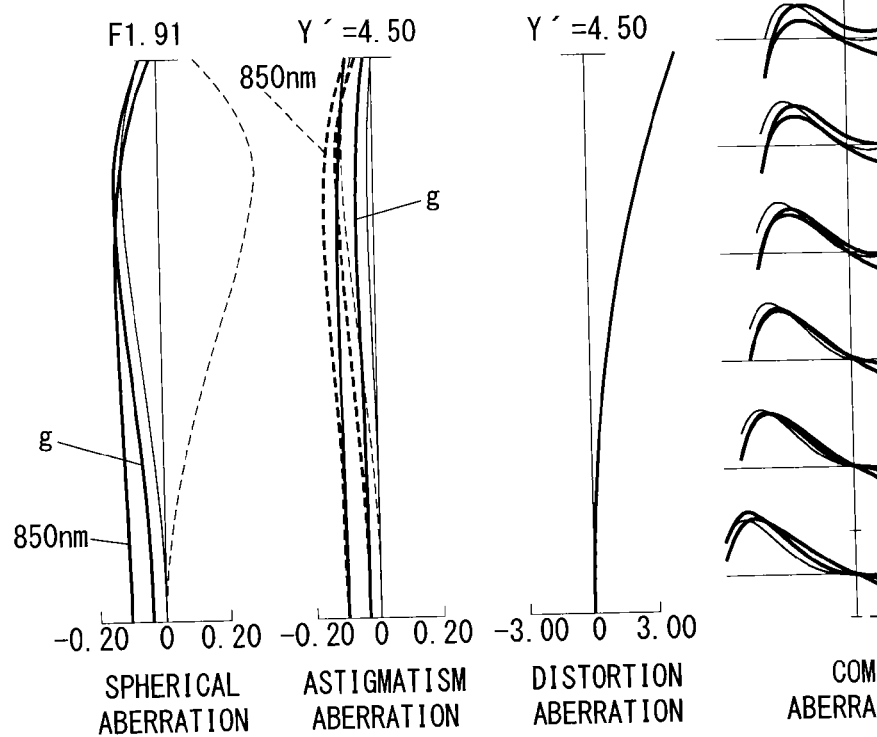
FIG. 10 shows graphs drawing aberrations curves at the telephoto end of the zoom lens unit according to Embodiment 2.

FIGS. 8 to 10 respectively show spherical aberration graphs, astigmatism aberration graphs, distortion aberration graphs, and coma aberration graphs at the wide-angle end, at the intermediate focal length, and at the telephoto end of the zoom lens unit 1 according to Embodiment 2. As illustrated in FIGS. 8 to 10, the zoom lens unit 1 according to Embodiment 2 sufficiently corrects aberrations and has a high resolving power compatible with the image pickup element of 1,000,000 to 5,000,000 pixels or more in the entire zooming range. Consequently, the zoom lens unit 1 according to Embodiment 2 can achieve compactness and a high imaging performance.

Embodiment 3

A numerical example according to Embodiment 3 illustrated in FIG. 3 is shown below. Table 7 shows optical characteristics of each optical element, and Table 8 shows coefficients C2 and C4 in the phase function.

TABLE 7

| LENS SURFACE | R | D | $N_d$ | $v_d$ | Glass |
|---|---|---|---|---|---|
| 1 | 128.907 | 2.50 | 1.74950 | 35.33 | S-NBH51 (OHARA) |
| 2* | 53.705 | 14.89 | 1.58913 | 61.13 | S-BAL35 (OHARA) |
| 3 | −521.533 | 0.50 | | | |
| 4 | 50.504 | 9.01 | 1.49700 | 81.54 | S-FPL51 (OHARA) |
| 5 | 221.808 | A | | | |
| 6 | 169.847 | 1.50 | 1.90366 | 31.31 | TAFD25 (HOYA) |
| 7 | 14.541 | 7.17 | | | |
| 8 | −33.765 | 1.20 | 1.48749 | 70.24 | S-FSL5 (OHARA) |
| 9 | 19.949 | 4.19 | 1.92286 | 20.88 | E-FDS1 (HOYA) |
| 10 | 88.128 | B | | | |
| 11 | −25.837 | 1.20 | 1.78800 | 47.37 | S-LAH64 (OHARA) |
| 12 | 131.908 | 2.21 | 1.92286 | 18.90 | S-NPH2 (OHARA) |
| 13 | −192.018 | C | | | |
| 14 | ∞ | 0.80 | 1.51633 | 64.14 | S-BSL7 (OHARA) |
| 15 | ∞ | 0.50 | | | |
| 16 | AS | 0.50 | | | |
| 17 | 151.970 | 4.11 | 1.49700 | 81.54 | S-FPL51 (OHARA) |
| 18 | −24.793 | 0.50 | | | |
| 19 | 60.701 | 3.24 | 1.53775 | 74.70 | S-FPM3 (OHARA) |
| 20 | −74.879 | 0.50 | | | |
| 21 | 30.032 | 5.01 | 1.49700 | 81.54 | S-FPL51 (OHARA) |
| 22 | −27.559 | 1.20 | 1.85026 | 32.27 | S-LAH71 (OHARA) |
| 23 | 1158.281 | 1.47 | | | |
| 24 | −41.635 | 1.20 | 1.53110 | 56.00 | ZEONEX E48R |
| 25 | −105.780 | 0.50 | | | |
| 26 | 17.000 | 3.87 | 1.49700 | 81.54 | S-FPL51 (OHARA) |
| 27 | 292.249 | 8.02 | | | |
| 28 | 23.167 | 1.20 | 1.83400 | 37.16 | S-LAH60 (OHARA) |
| 29 | 9.529 | 1.80 | | | |
| 30 | 23.850 | 2.83 | 1.56732 | 42.82 | S-TIL26 (OHARA) |
| 31 | −40.099 | 11.00 | | | |
| 32 | ∞ | 2.70 | 1.51633 | 64.14 | S-BSL7 (OHARA) |
| 33 | ∞ | | | | |

TABLE 8

| LENS SURFACE | λ ($\lambda_d$) | $C_2$ | $C_4$ |
|---|---|---|---|
| 2* | 587.6 | −4.55824E−05 | 9.96811E−09 |

A total focal length f of the optical system, F-number, half-field angle ω, an interval (distance) A between the first lens group G1 and second lens group G2, an interval (distance) B between the second lens group G2 and third lens group G3, an interval (distance) C between the third lens group G3 and the aperture stop AS change when zooming from the wide-angle end (WIDE) to the telephoto end (TELE). The following Table 9 shows those values in Embodiment 3.

TABLE 9

|  | WIDE | MEAN | TELE |
|---|---|---|---|
| f | 7.72 | 29.98 | 116.32 |
| F-NUMBER | 1.82 | 1.82 | 1.91 |
| ω | 30.73 | 8.26 | 2.14 |

TABLE 9-continued

|   | WIDE | MEAN | TELE |
|---|---|---|---|
| A | 1.5001 | 38.6495 | 55.6365 |
| B | 54.7758 | 12.7821 | 3.4378 |
| C | 4.2984 | 9.1426 | 1.5000 |

Constant values for the positive lenses L4a1, L4a3, and L4a6 (S-FPL51) in the conditions (1), (2), and (3) according to Embodiment 3 are:

$$n_d = 1.49700 \quad (1)$$

$$v_d = 81.54 \quad (2)$$

$$P_{g,F} - (-0.001802 \times v_d + 0.6483) = 0.036. \quad (3)$$

The constant values for the positive lenses L4a2 (S-FPM3) in the conditions (1), (2), and (3) according to Embodiment 3 are:

$$n_d = 1.53775 \quad (1)$$

$$v_d = 74.70 \quad (2)$$

$$P_{g,F} - (-0.001802 \times v_d + 0.6483) = 0.026. \quad (3)$$

Constant values in the conditions (4) to (9) according to Embodiment 3 are:

$$f_{\_pla}/f_4 = -6.65 \quad (4)$$

$$f_{\_pla}/f_w = -16.87 \quad (5)$$

$$f_{1doe}/f = 126.44 \quad (6)$$

$$D_{4d}/D_4 = 0.23 \quad (7)$$

$$f_1/f_t = 0.75 \quad (8)$$

$$f_4/f_t = 0.17. \quad (9)$$

FIGS. 11 to 13 respectively show spherical aberration graphs, astigmatism aberration graphs, distortion aberration graphs, and coma aberration graphs at the wide-angle end, at the intermediate focal length, and at the telephoto end of the zoom lens unit 1 according to Embodiment 3. As illustrated in FIGS. 11 to 13, the zoom lens unit 1 according to Embodiment 3 sufficiently corrects aberrations and has a high resolving power compatible with the image pickup element of 1,000,000 to 5,000,000 pixels or more in the entire zooming range. Consequently, the zoom lens unit 1 according to Embodiment 3 can achieve compactness and a high imaging performance.

Embodiment 4

A numerical example according to Embodiment 4 illustrated in FIG. 4 is shown below. Table 10 shows optical characteristics of each optical element, and Table 11 shows coefficients C2 and C4 in the phase function.

TABLE 10

| LENS SURFACE | R | D | $N_d$ | $v_d$ | Glass |
|---|---|---|---|---|---|
| 1 | 129.344 | 2.50 | 1.74950 | 35.33 | S-NBH51 (OHARA) |
| 2* | 53.903 | 14.95 | 1.58913 | 61.13 | S-BAL35 (OHARA) |
| 3 | -537.022 | 0.50 | | | |
| 4 | 50.795 | 9.07 | 1.49700 | 81.54 | S-FPL51 (OHARA) |
| 5 | 225.440 | A | | | |
| 6 | 172.832 | 1.50 | 1.90366 | 31.31 | TAFD25 (HOYA) |
| 7 | 14.708 | 7.22 | | | |
| 8 | -33.151 | 1.20 | 1.48749 | 70.24 | S-FSL5 (OHARA) |
| 9 | 20.418 | 4.18 | 1.92286 | 20.88 | E-FDS1 (HOYA) |
| 10 | 93.725 | B | | | |
| 11 | -26.025 | 1.20 | 1.78800 | 47.37 | S-LAH64 (OHARA) |
| 12 | 112.133 | 2.24 | 1.92286 | 18.90 | S-NPH2 (OHARA) |
| 13 | -207.451 | C | | | |
| 14 | AS | 0.50 | | | |
| 15 | ∞ | 0.80 | 1.51633 | 64.14 | S-BSL7 (OHARA) |
| 16 | ∞ | 0.50 | | | |
| 17 | 136.311 | 4.12 | 1.49700 | 81.54 | S-FPL51 (OHARA) |
| 18 | -25.027 | 0.50 | | | |
| 19 | 56.896 | 3.21 | 1.59522 | 67.73 | S-FPM2 (OHARA) |
| 20 | -84.740 | 0.50 | | | |
| 21 | 28.204 | 4.98 | 1.49700 | 81.54 | S-FPL51 (OHARA) |
| 22 | -28.891 | 1.20 | 1.85026 | 32.27 | S-LAH71 (OHARA) |
| 23 | 152.445 | 1.89 | | | |
| 24 | -33.304 | 1.20 | 1.53110 | 56.00 | ZEONEX E48R |
| 25 | -55.420 | 0.50 | | | |
| 26 | 17.000 | 3.83 | 1.49700 | 81.54 | S-FPL51 (OHARA) |
| 27 | 509.107 | 7.19 | | | |
| 28 | 19.400 | 1.20 | 1.85026 | 32.27 | S-LAH60 (OHARA) |
| 29 | 9.256 | 2.04 | | | |
| 30 | 30.651 | 2.64 | 1.59270 | 35.31 | S-TIL26 (OHARA) |
| 31 | -43.477 | 11.00 | | | |
| 32 | ∞ | 2.70 | 1.51633 | 64.14 | S-BSL7 (OHARA) |
| 33 | ∞ | | | | |

TABLE 11

| LENS SURFACE | $\lambda$ ($\lambda_d$) | $C_2$ | $C_4$ |
|---|---|---|---|
| 2* | 587.6 | -4.55824E-05 | 9.96811E-09 |

A total focal length f of the optical system, F-number, half-field angle ω, an interval (distance) A between the first lens group G1 and second lens group G2, an interval (distance) B between the second lens group G2 and third lens group G3, an interval (distance) C between the third lens group G3 and the aperture stop AS change when zooming from the wide-angle end (WIDE) to the telephoto end (TELE). The following Table 12 shows those values in Embodiment 4.

TABLE 12

|   | WIDE | MEAN | TELE |
|---|---|---|---|
| f | 7.72 | 29.99 | 116.34 |
| F-NUMBER | 1.80 | 1.80 | 1.91 |
| ω | 30.77 | 8.27 | 2.13 |
| A | 1.5000 | 38.8605 | 55.9480 |
| B | 54.9944 | 12.8013 | 3.4087 |
| C | 4.3623 | 9.1949 | 1.5000 |

Constant values for the positive lenses L4a1, L4a3, and L4a6 (S-FPL51) in the conditions (1), (2), and (3) according to Embodiment 4 are:

$$n_d = 1.49700 \quad (1)$$

$$v_d = 81.54 \quad (2)$$

$$P_{g,F} - (-0.001802 \times v_d + 0.6483) = 0.036. \quad (3)$$

The constant values for the positive lenses L4a2 (S-FPM2) in the conditions (1), (2), and (3) according to Embodiment 4 are:

$$n_d=1.58522 \quad (1)$$

$$v_d=67.73 \quad (2)$$

$$P_{g,F}-(-0.001802 \times v_d+0.6483)=0.018. \quad (3)$$

Constant values in the conditions (4) to (9) according to Embodiment 4 are:

$$f_{-pla}/f_4=-8.27 \quad (4)$$

$$f_{-pla}/f_w=-20.76 \quad (5)$$

$$f_{1doe}/f=125.74 \quad (6)$$

$$D_{4a}/D_4=0.21 \quad (7)$$

$$f_1/f_t=0.75 \quad (8)$$

$$f_4/f_t=0.17. \quad (9)$$

FIGS. 14 to 16 respectively show spherical aberration graphs, astigmatism aberration graphs, distortion aberration graphs, and coma aberration graphs at the wide-angle end, at the intermediate focal length, and at the telephoto end of the zoom lens unit according to Embodiment 4. As illustrated in FIGS. 14 to 16, the zoom lens unit 1 according to Embodiment 2 sufficiently corrects aberrations and has a high resolving power compatible with the image pickup element of 1,000,000 to 5,000,000 pixels or more in the entire zooming range. Consequently, the zoom lens unit 1 according to Embodiment 4 can achieve compactness and a high imaging performance.

An experiment regarding defocus amounts of each of the zoom lens units 1 according to Embodiments 1 to 4 has been carried out. Specifically, a change amount in air interval (amount of air expansion/contradiction) caused by a temperature change is calculated using a linear expansion coefficient of aluminum, and the defocus amount (a distance from the best focus) of the zoom lens unit 1 caused by the temperature change between 20 degree C. to 70 degree C. is calculated by taking linear expansion coefficients and changes in refractive indexes of glasses and resin along with the calculated air interval into consideration. The calculation results are shown below. As shown, the defocus amounts of the zoom lens units 1 according to Embodiments 1 to 4 are adequately small.

In Embodiment 1,
defocus amount at the wide-angle end: +0.013 mm
defocus amount at the telephoto end: +0.001 mm.
In Embodiment 2,
defocus amount at the wide-angle end: −0.023 mm
defocus amount at the telephoto end: −0.036 mm.
In Embodiment 3,
defocus amount at the wide-angle end: +0.003 mm
defocus amount at the telephoto end: −0.010 mm.
In Embodiment 4,
defocus amount at the wide-angle end: +0.023 mm
defocus amount at the telephoto end: +0.011 mm.

Embodiment 5

A camera (imaging apparatus) according to Embodiment 5 is now explained with reference to FIGS. 17A, 17B, and 18. The camera is configured to include the zoom lens unit 1 according to any of Embodiments 1 to 4 as an imaging optical system for still images or for videos. Although Embodiment 5 exemplifies a digital camera as the camera, this is only an example and it is possible to include the zoom lens units 1 according to any of Embodiments 1 to 4 into a video camera, which is mainly used for videos, or a camera, which is mainly used for still images such as a silver-salt film camera.

Further, it is also common to include the digital camera into a portable information terminal device (e.g., a mobile phone or a personal data acquisition (PDA)) and/or a portable terminal device (e.g., a smart phone or an electronic tablet device). Although their appearances may be different, since those portable devices substantially include the same function and configuration of the digital camera, etc., it is possible to use the zoom lens unit 1 according to any of Embodiments 1 to 4 as an imaging optical system of the portable devices.

Figure 17A:
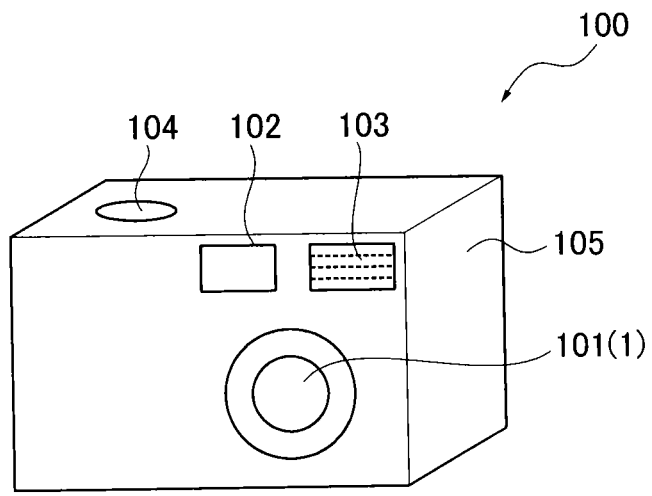
FIG. 17A illustrates diagrammatic perspective view from a front side schematically showing an overall appearance of a digital camera (imaging apparatus) according to Embodiment 5.
Figure 17B:
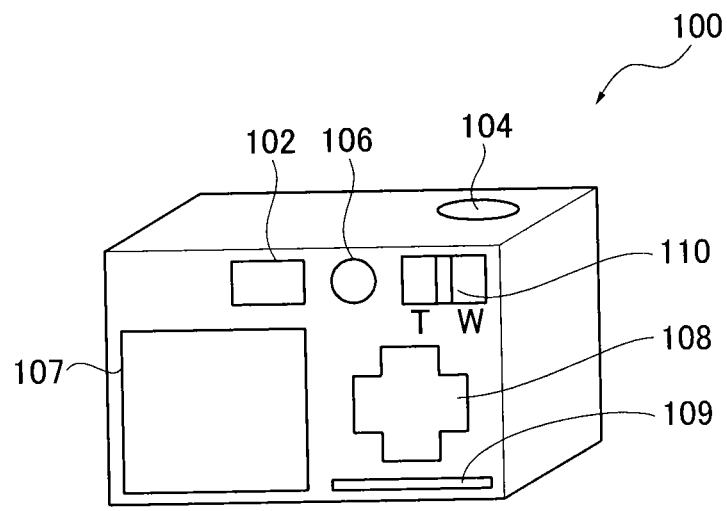
FIG. 17B illustrates diagrammatic perspective view from a back side schematically showing an overall appearance of a digital camera (imaging apparatus) according to Embodiment 5.
Figure 18:
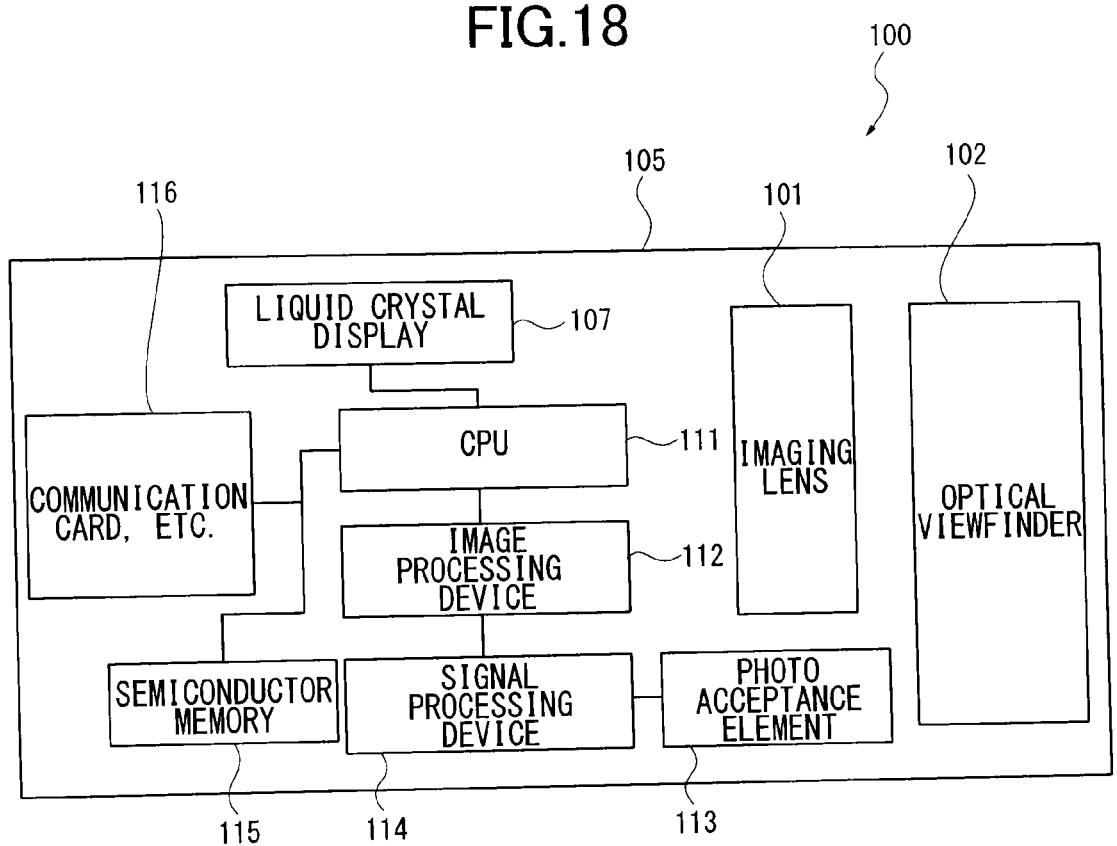
FIG. 18 is a function block diagram of the digital camera shown in FIGS. 17A and 17B.

As shown in FIGS. 17A and 17B, the digital camera 100 according to Embodiment 5 comprises an imaging lens (photographing lens) 101, an optical viewfinder 102, a stroboscope (electronic flash light) 103, a shutter button 104, a power switch 106, a liquid crystal display 107, an operation switch (button) 108, a memory card slot 109, and a zoom switch 110, etc. in a camera body (housing) 105. Further, as shown in FIG. 18, the digital camera 100 is equipped with a central processing unit (CPU) 111, an image processing device 112, a photo acceptance element 113, signal processing device 114, a semiconductor memory 115, and a communication card, etc. 116 inside the camera body 105.

The digital camera 100 includes the imaging lens 101 as an imaging optical system and the photo acceptance element 113 configured as an image sensor using a CMOS imaging element or a CCD imaging element, etc., and scans an optical image formed by the imaging lens 101 using the photo acceptance element 113. The digital camera 100 uses the zoom lens unit 1 according to any of Embodiments 1 to 4 as the imaging lens 101.

The signal processing device 114 controlled by the CPU 111 processes outputs from the photo acceptance element 113 and converts the outputs into a digital image data. The image processing device 112, which is also controlled by the CPU 111, performs a predetermined image processing on the converted digital image data, and the result (processed data) is stored into the semiconductor memory 115 such as a nonvolatile memory. The semiconductor memory 115 can be a memory card inserted to the memory card slot 109 or a built-in semiconductor memory installed on a circuit board of the digital camera. The liquid crystal display 107 can display an image being taken and/or an image stored in the semiconductor memory 115. The images stored in the semiconductor memory 115 can be transmitted to outside via the communication card, etc. 116, which is inserted to a communication card slot (although not particularly illustrated, it is possible to use the memory card slot 109 as the communication card slot as well).

A lens surface on the object side of the imaging lens 101 is covered by a lens barrier (not shown) when the camera is carried by a user. In contrast, the lens surface on the object side of the imaging lens 101 is exposed upon turning ON the power switch 106. The optical system (e.g., lenses) of the zoom lens unit 1 aligns to be, for example the arrangement at the wide-angle end (short-focal length end) inside the lens barrel of the imaging lens 101 upon turning ON the power switch 106. The alignment of the optical system is changed to the arrangement at the telephoto end (long-focal length end) through the arrangement at the immediate focal length by operating the zoom switch 110.

The optical system of the optical viewfinder 102 may preferably change the magnification ratio along with the change in the filed angle of the imaging lens 101. In most cases, focusing is adjusted by half-depressing the shutter button 104. The focus of the zoom lens unit 1 according to any of Embodiments 1 to 4 of the present invention can be adjusted by partially moving the optical system (lens groups, etc.) composing the zoom lens unit 1. Photographing (taking an image) is executed by depressing the shutter button 104 fully, and the abovementioned processing is performed.

The operation switch 108 is operated (manipulated) to display an image stored in the semiconductor memory 115 on the liquid crystal display 107 or to transmit stored images to outside via the communication card, etc. 116. The semiconductor memory 115 and the communication card, etc. 116 are used by inserting them to a corresponding dedicated slot such as the memory card slot 109 and the communication card slot or to a general (undedicated) slot.

Arranging each group of the imaging forming lenses apart from the optical axis should be acceptable when the imaging lens 101 is in a collapsed state. For instance, at least one of the second lens group G2 and third lens group G3 can intentionally deviate from the optical axis to be loaded in the lens barrel in parallel with the other lens groups when the imaging lens 101 is in the collapsed state. With this, it becomes possible to make the digital camera thinner.

As explained above, the imaging apparatus (e.g., a digital camera) and/or the information device having the imaging function can include the imaging lens 101 composed of the zoom lens unit 1 according to any of Embodiments 1 to 4 as the imaging optical system. Therefore, it becomes possible to provide a high quality compact imaging apparatus (e.g., a digital camera) and/or an information device (e.g., a portable terminal device) in which the magnification ratio is about 16 times, the half-field angle at the wide-angle end is about 30 degrees, F-number at the wide-angle end is equal to or smaller than 2.0, and F-number at the telephoto end is around 2.0. Each of the imaging apparatus and the information device also includes about 16 lenses at a relatively low cost, sufficiently corrects aberrations even in the near infrared region, and has a high resolving power compatible with an image pickup element of at least 1,000,000 to 5,000,000 pixels in the entire zooming range. The zoom lens unit 1 is also applicable to an imaging lens of a silver-salt film camera and/or to a projection lens of a projector.

Although the present invention has been described in terms of exemplary embodiments, it is not limited thereto. It should be appreciated that variations may be made in the embodiments described by persons skilled in the art without departing from the scope of the present invention as defined by the following claims.

What is claimed is:

1. A zoom lens unit comprising: in order from an object side to an image plane side,
    a first lens group with positive refractive power;
    a second lens group with negative refractive power;
    a third lens group with negative refractive power; and
    a fourth lens group with positive refractive power;
    wherein the first lens group and the fourth lens group are fixed relative to the image plane, while the second lens group moves toward the image plane side and the third lens group moves when changing a magnification ratio from a wide-angle end to a telephoto end,
    the fourth lens group includes a resin lens with negative refractive power, and at least one positive lens, and said at least one positive lens of the fourth lens group fulfils conditions (1), (2), and (3):

$$1.40 < n_d < 1.65 \quad (1)$$

$$65.0 < v_d < 100.0 \quad (2)$$

$$0.015 < P_{g,F} - (-0.001802 \times v_d + 0.6483) < 0.060 \quad (3)$$

where $n_d$ represents a refractive index of the positive lens, $v_d$ represents an Abbe number of the positive lens, and $P_{g,F}$ represents a partial dispersion ratio of the positive lens and is expressed by: $P_{g,F} = (n_g - n_F)/(n_F - n_C)$, where $n_g$, $n_F$, and $n_C$ represent refractive indexes at g-line, F-line, and C-line of the positive lens respectively,
wherein a condition (4) is fulfilled:

$$-12.0 < f_{-pla}/f_4 < -3.0 \quad (4)$$

where $f_{-pla}$ represents a focal length of the resin lens in the fourth lens group, and $f_4$ represents a focal length of the fourth lens group.

2. The zoom lens unit according to claim 1, wherein the fourth lens group is divided into a fourth front lens group which is disposed on the object side than a position where a gap between lenses in the fourth lens group is widest, and a fourth latter lens group which is disposed on the image plane side than said position, and
    the fourth front lens group includes, in order from the object side to the image plane side, a first positive lens, a second positive lens, a third positive lens, first negative lens, a second negative lens made of resin, and a fourth positive lens.

3. The zoom lens unit according to claim 1, wherein a condition (6) is fulfilled:

$$0.2 < D_{4a}/D_4 < 0.4 \quad (6)$$

where $D_{4a}$ represents a widest gap in which a gap between lenses in the fourth lens group is widest, and $D_4$ represent a thickness of the fourth lens group.

4. The zoom lens unit according to claim 1, wherein conditions (7) and (8) are fulfilled:

$$0.6 < f_1/f_t < 0.9 \quad (7)$$

$$0.1 < f_4/f_t < 0.3 \quad (8)$$

where $f_1$ represents a focal length of the first lens group G1, $f_4$ represents a focal length of the fourth lens group, and $f_t$ represents a total focal length at the telephoto end.

5. The zoom lens unit according to claim 1, wherein focus of the zoom lens unit is adjusted by the first lens group.

6. An imaging apparatus including the zoom lens unit according to claim 1 as an imaging optical system for a still image.

7. An imaging apparatus including the zoom lens unit according to claim 1 as an imaging optical system for a video.

8. A zoom lens unit comprising: in order from an object side to an image plane side,
    a first lens group with positive refractive power;
    a second lens group with negative refractive power;
    a third lens group with negative refractive power; and
    a fourth lens group with positive refractive power;
    wherein the first lens group and the fourth lens group are fixed relative to the image plane, while the second lens group moves toward the image plane side and the third lens group moves when changing a magnification ratio from a wide-angle end to a telephoto end, the fourth lens group includes a resin lens with negative refractive power, and at least one positive lens, and said at least one positive lens of the fourth lens group fulfils conditions (1), (2), and (3):

$$1.40 \leq n_d < 1.65 \quad (1)$$

$$65.0 < v_d < 100.0 \quad (2)$$

$$0.015 < P_{g,F} - (-0.001802 \times v_d + 0.6483) < 0.060 \quad (3)$$

where $n_d$ represents a refractive index of the positive lens, $v_d$ represents an Abbe number of the positive lens, and $P_{g,F}$ represents a partial dispersion ratio of the positive lens and is expressed by: $P_{g,F} = (n_g - n_F)/(n_F - n_C)$, where $n_g$, $n_F$, and $n_C$ represent refractive indexes at g-line, F-line, and C-line of the positive lens respectively, wherein the first lens group includes a diffraction lens surface, and a condition (5) is fulfilled:

$$50 < f_{1doe}/f_1 < 200 \quad (5)$$

where $f_{1doe}$ represents a focal length of the diffraction lens surface, and $f_1$ represents a focal length of the first lens group.

9. A zoom lens unit comprising: in order from an object side to an image plane side,
   a first lens group with positive refractive power;
   a second lens group with negative refractive power;
   a third lens group with negative refractive power; and
   a fourth lens group with positive refractive power;

wherein the first lens group and the fourth lens group are fixed relative to the image plane, while the second lens group moves toward the image plane side and the third lens group moves when changing a magnification ratio from a wide-angle end to a telephoto end, the fourth lens group includes a resin lens with negative refractive power, and at least one positive lens, and said at least one positive lens of the fourth lens group fulfils conditions (1), (2), and (3):

$$1.40 < n_d < 1.65 \quad (1)$$

$$65.0 < v_d < 100.0 \quad (2)$$

$$0.015 < P_{g,F} - (-0.001802 \times v_d + 0.6483) < 0.060 \quad (3)$$

where $n_d$ represents a refractive index of the positive lens, $v_d$ represents an Abbe number of the positive lens, and $P_{g,F}$ represents a partial dispersion ratio of the positive lens and is expressed by: $P_{g,F} = (n_g - n_F)/(n_F - n_C)$, where $n_g$, $n_F$, and $n_C$ represent refractive indexes at g-line, F-line, and C-line of the positive lens respectively, wherein the fourth lens group is divided into a fourth front lens group which is disposed on the object side than a position where a gap between the lenses in the fourth lens group is widest, and a fourth latter lens group which is disposed on the image plane side than said position, and the fourth front lens group includes at least two positive lenses which fulfill the conditions (1), (2), and (3).

* * * * *